US006758333B2

(12) United States Patent
Sherman

(10) Patent No.: US 6,758,333 B2
(45) Date of Patent: *Jul. 6, 2004

(54) PACKAGING FOR RECORDABLE MEDIA

(75) Inventor: Michael T. Sherman, Stanley, NC (US)

(73) Assignee: Dalton Marketing, LLC, Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/095,619

(22) Filed: Mar. 11, 2002

(65) Prior Publication Data

US 2002/0092782 A1 Jul. 18, 2002

Related U.S. Application Data

(63) Continuation-in-part of application No. 09/723,738, filed on Nov. 28, 2000, now Pat. No. 6,505,737.

(51) Int. Cl.⁷ .............................................. B65D 85/30
(52) U.S. Cl. .................... 206/308.1; 206/312
(58) Field of Search ............................ 206/308.1, 309, 206/310–313; 40/124.15

(56) References Cited

U.S. PATENT DOCUMENTS

| | | | |
|---|---|---|---|
| 1,347,269 A | 7/1920 | Greble |
| 2,125,424 A | 8/1938 | Cloud |
| 2,142,826 A | 1/1939 | Rosello |
| 2,311,218 A | 2/1943 | Frandrich |
| 2,449,911 A | 9/1948 | Roth |
| 2,472,166 A | 6/1949 | Mathewson |
| 2,530,950 A | 9/1950 | Ebert |
| 2,720,046 A | 10/1955 | Decker |
| 2,920,409 A | 1/1960 | Sampson |
| 2,954,119 A | 9/1960 | Goldsholl |
| 2,975,905 A | 3/1961 | Foland |
| 3,029,051 A | 4/1962 | Nichols |
| 3,057,470 A | 10/1962 | Heiber |
| 3,226,863 A | 1/1966 | Southard |
| 3,549,225 A | 12/1970 | Scaccia |
| 3,763,583 A | 10/1973 | Gregg |
| 4,582,286 A | 4/1986 | Mancuso |
| 5,101,973 A | 4/1992 | Martinez |
| 5,154,284 A | 10/1992 | Starkey |
| 5,248,032 A | 9/1993 | Sheu |
| 5,253,751 A | 10/1993 | Wipper |
| 5,259,133 A | 11/1993 | Burtch |
| 5,287,641 A | 2/1994 | Showers |
| 5,479,732 A | 1/1996 | Burtch |
| 5,608,977 A | 3/1997 | Burtch |
| 5,613,311 A | 3/1997 | Burtch |
| 5,641,063 A | 6/1997 | Gambardella |
| 5,711,101 A | 1/1998 | Mueller |
| 5,732,491 A | 3/1998 | Burtch |
| 5,740,957 A | 4/1998 | Wenkman |
| 5,746,689 A | 5/1998 | Murphy |
| 5,901,843 A | 5/1999 | Gambardella |
| 5,901,844 A | 5/1999 | Gambardella |
| 6,059,101 A | 5/2000 | Gambardella |
| 6,505,737 B1 * | 1/2003 | Sherman ................ 206/308.1 |

FOREIGN PATENT DOCUMENTS

| | | |
|---|---|---|
| GB | 162551 | 5/1921 |
| GB | 881755 | 11/1961 |

* cited by examiner

Primary Examiner—Shian T. Luong
(74) Attorney, Agent, or Firm—Betty A. Ryberg; Kaye Scholer LLP

(57) ABSTRACT

A packaging system for CDs, DVDs, software disks and the like (media items) is provided which allows for media items to be displayed yet which is durable and can therefore be shipped. The packaging system also allows for information to be displayed on it when it is stored, and for relatively easy insertion of the media item. In addition, the packaging system allows for bulky items such as manuals, pamphlets and photographs to be packaged in it.

19 Claims, 25 Drawing Sheets

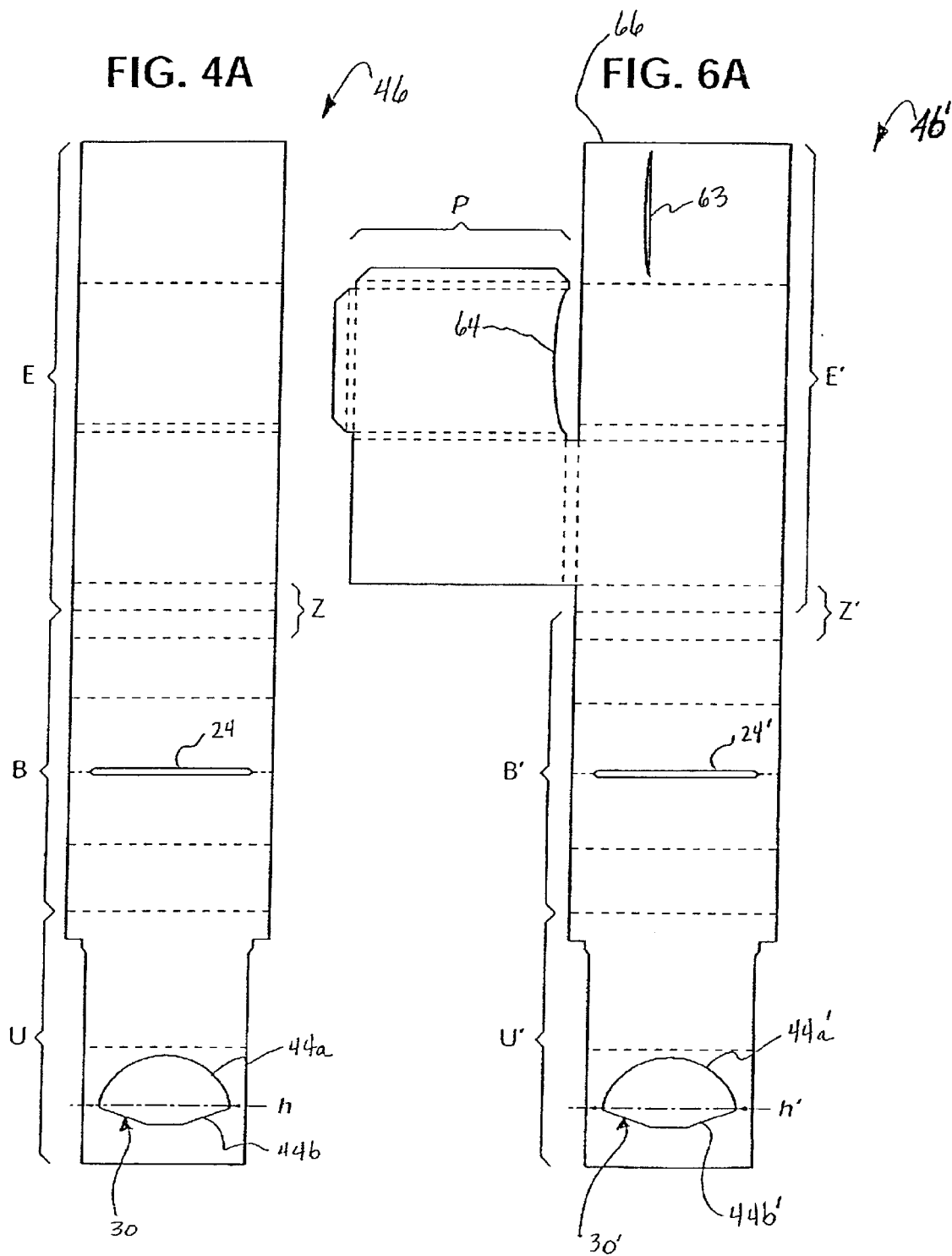

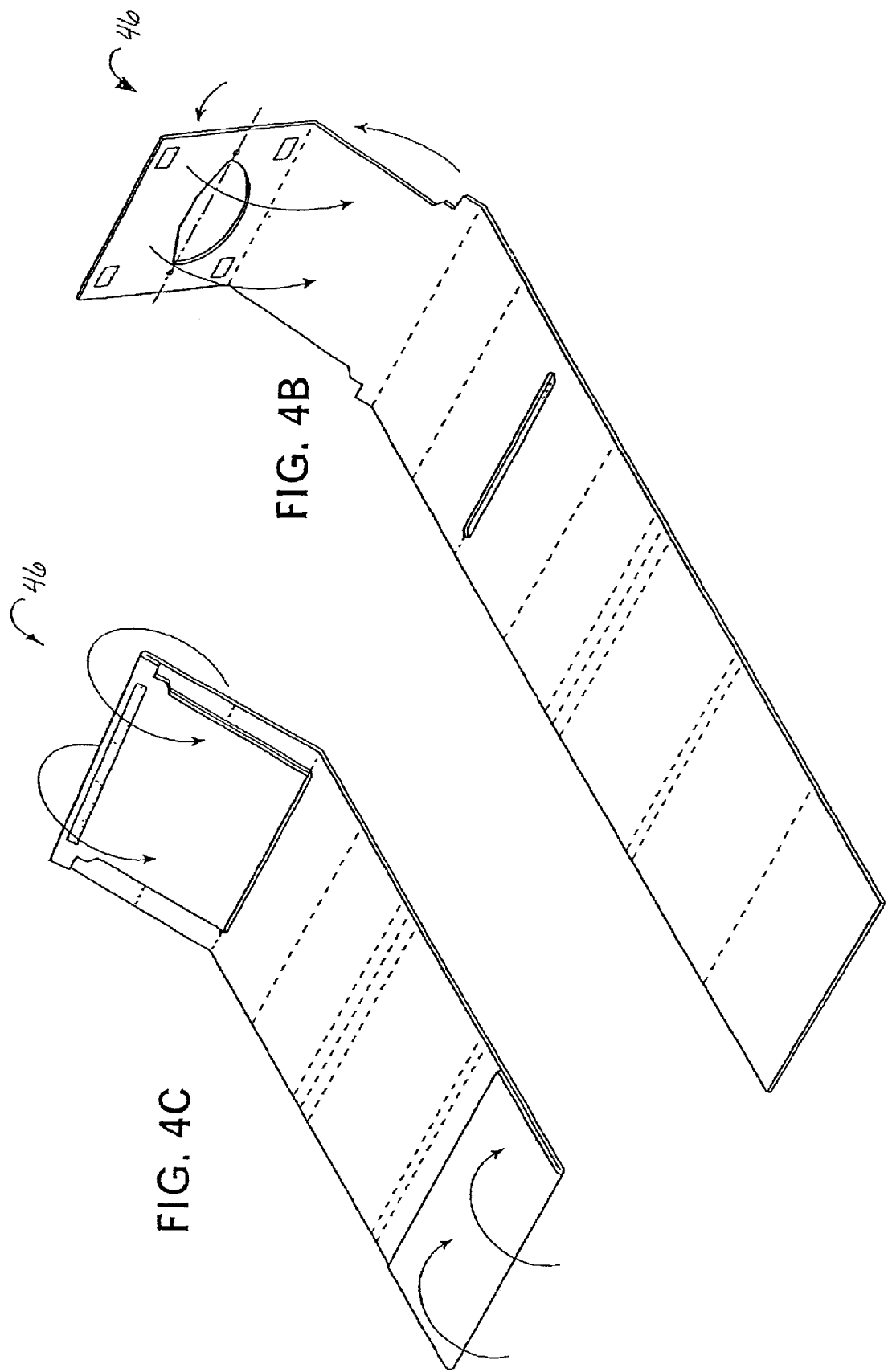

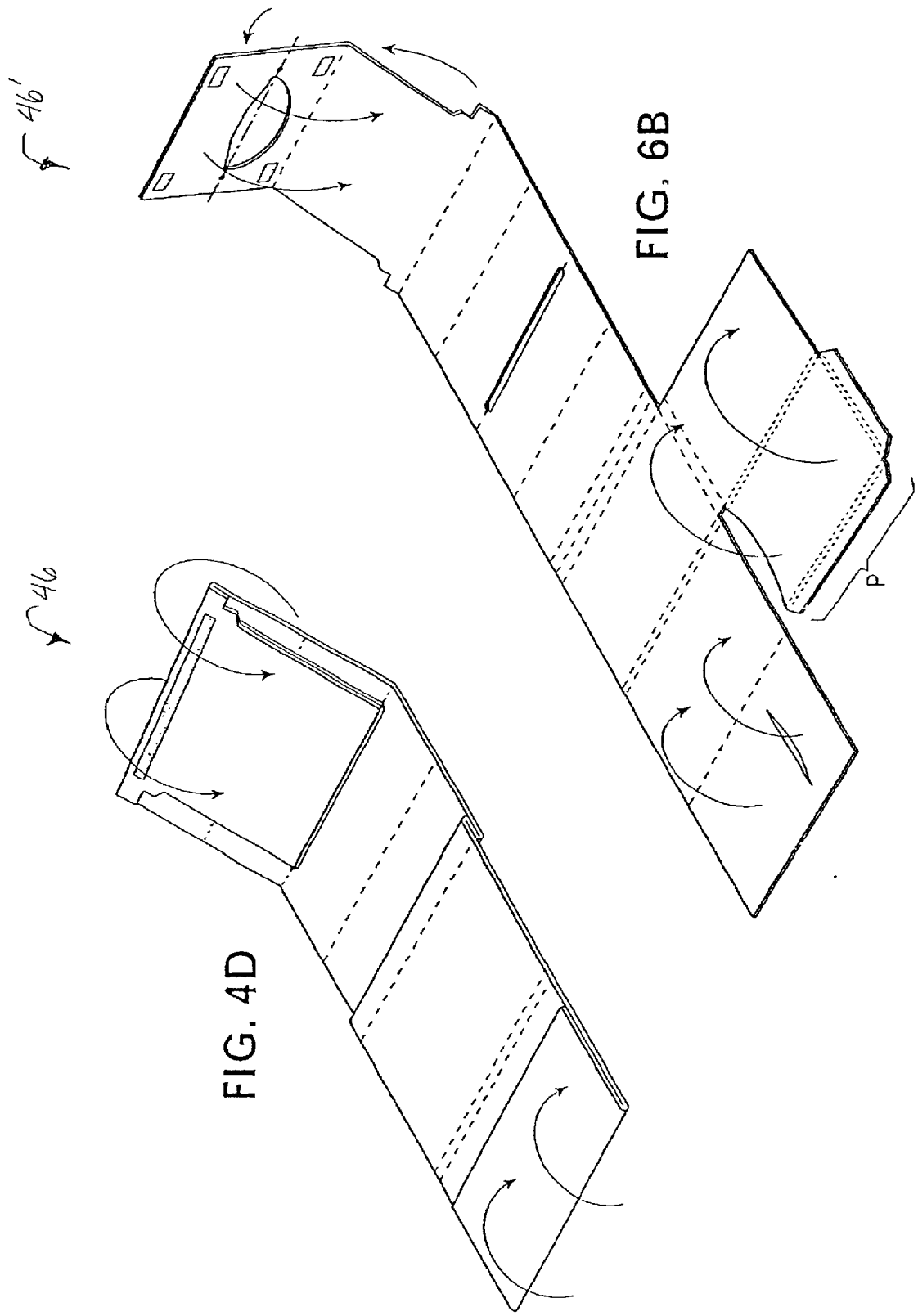

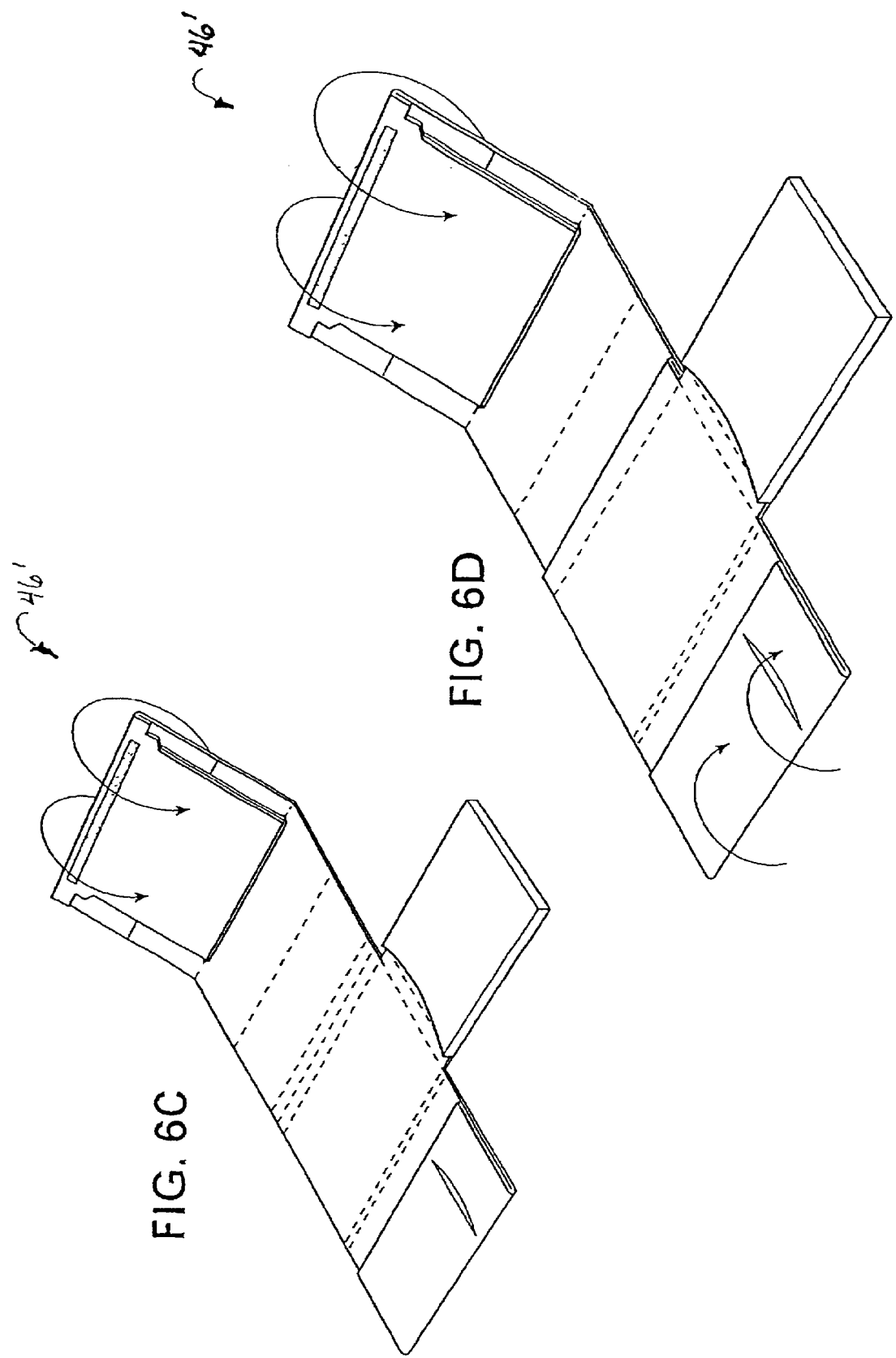

FIG. 9
FIG. 10
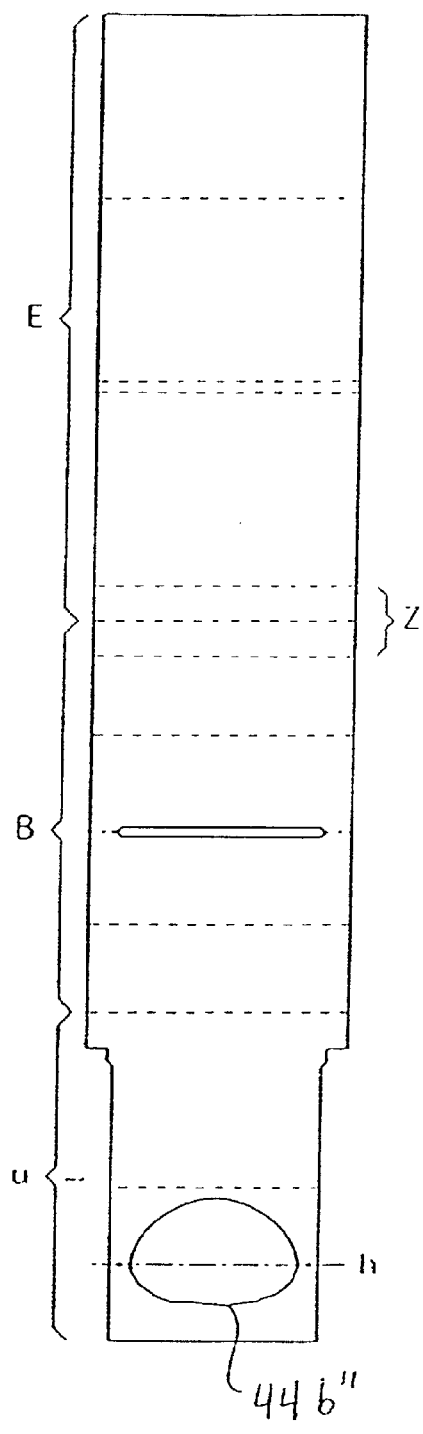
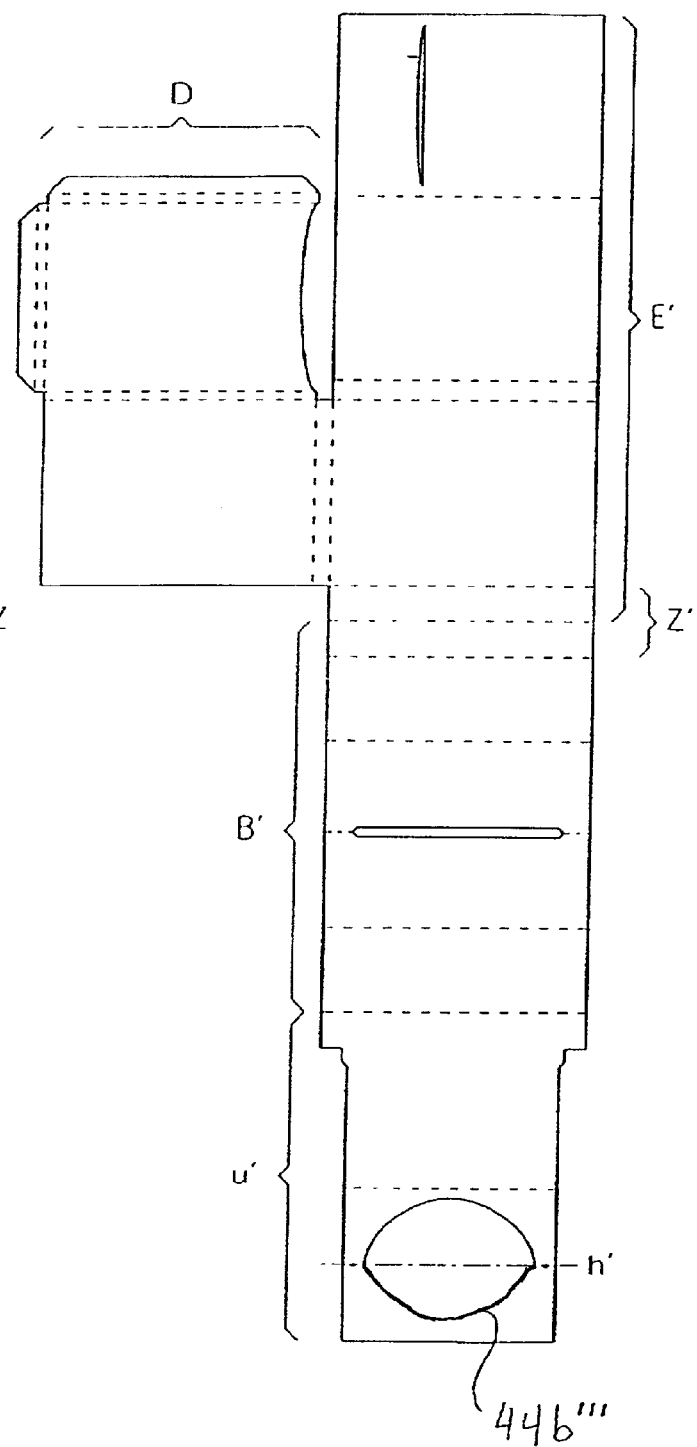

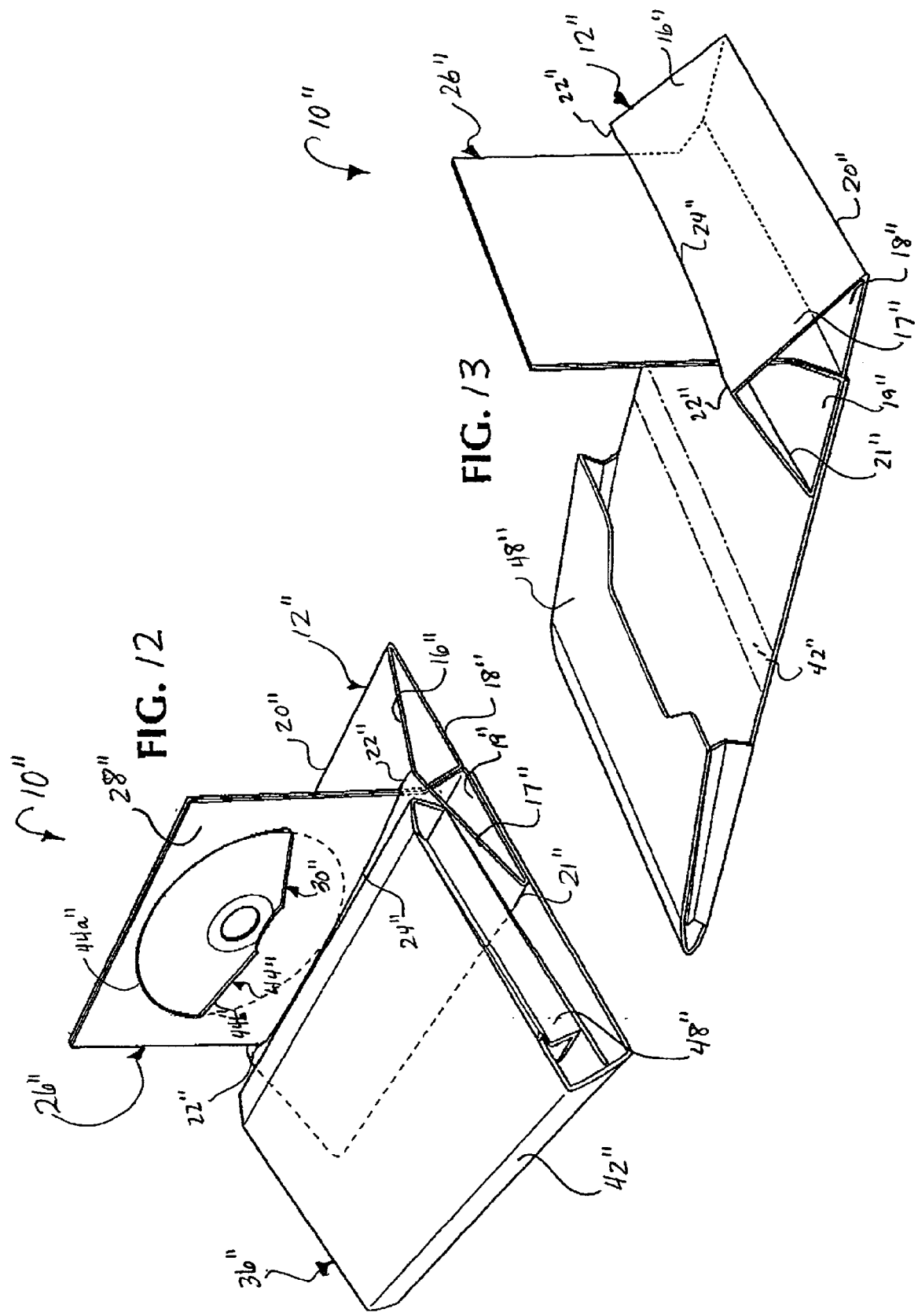

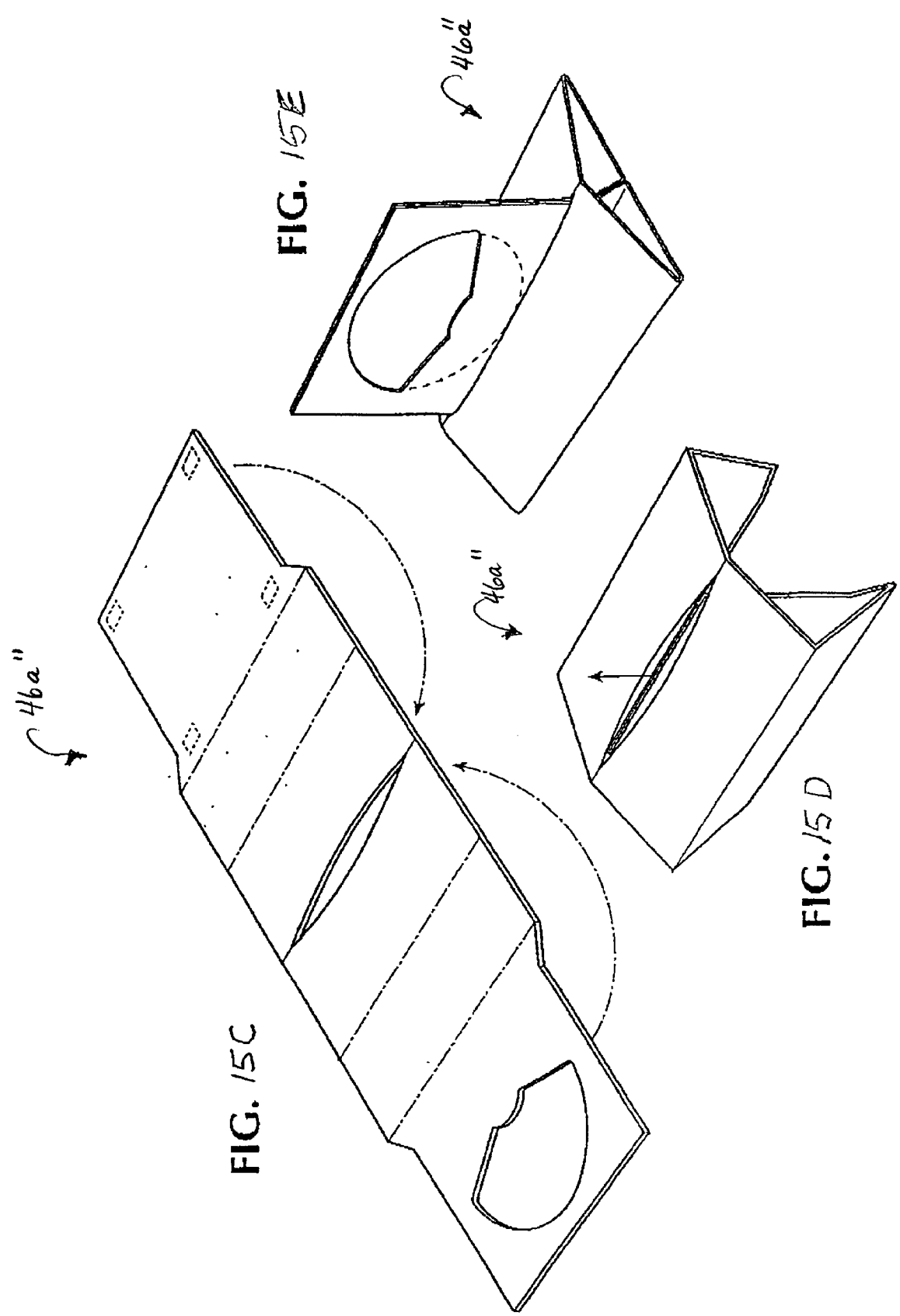

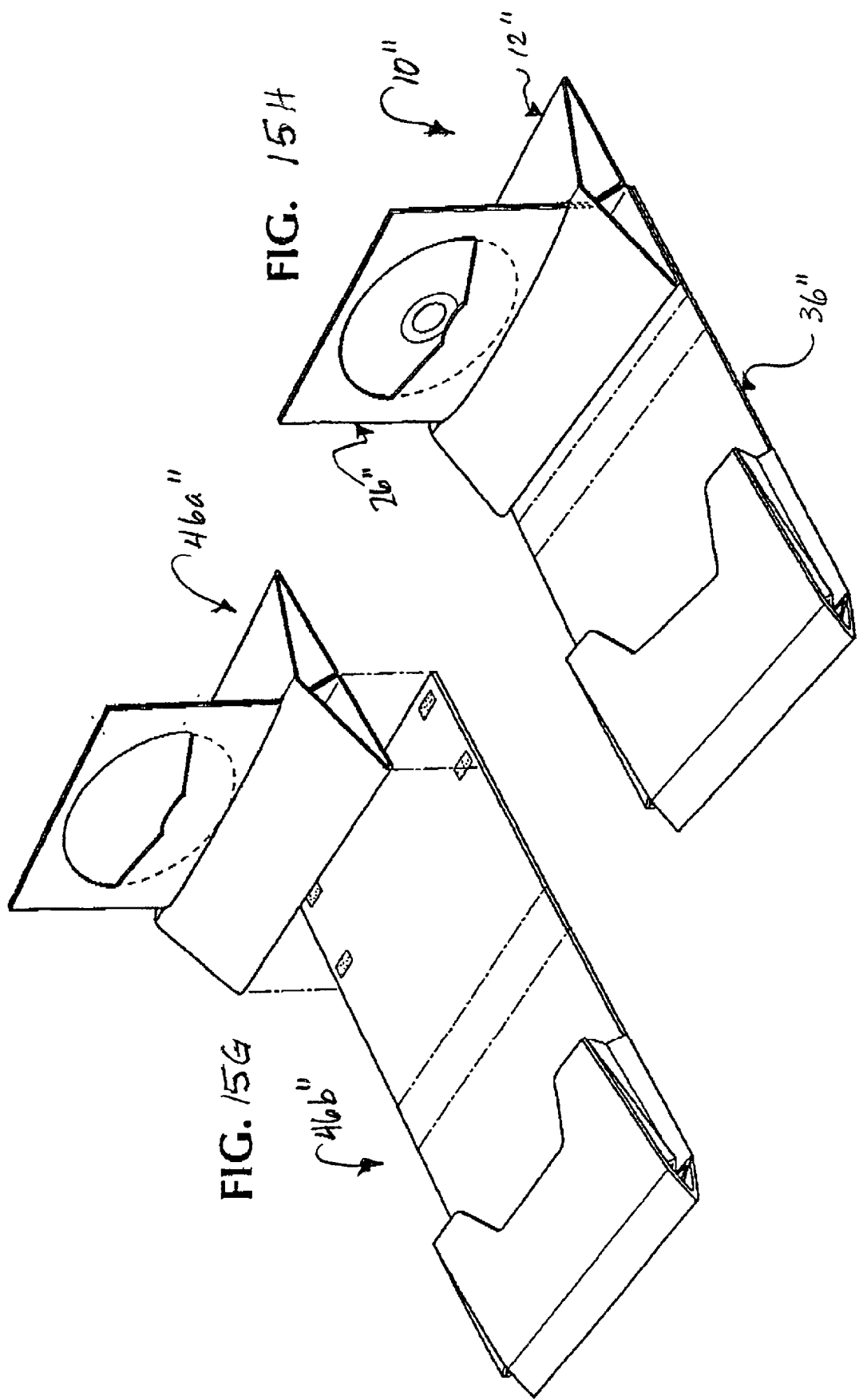

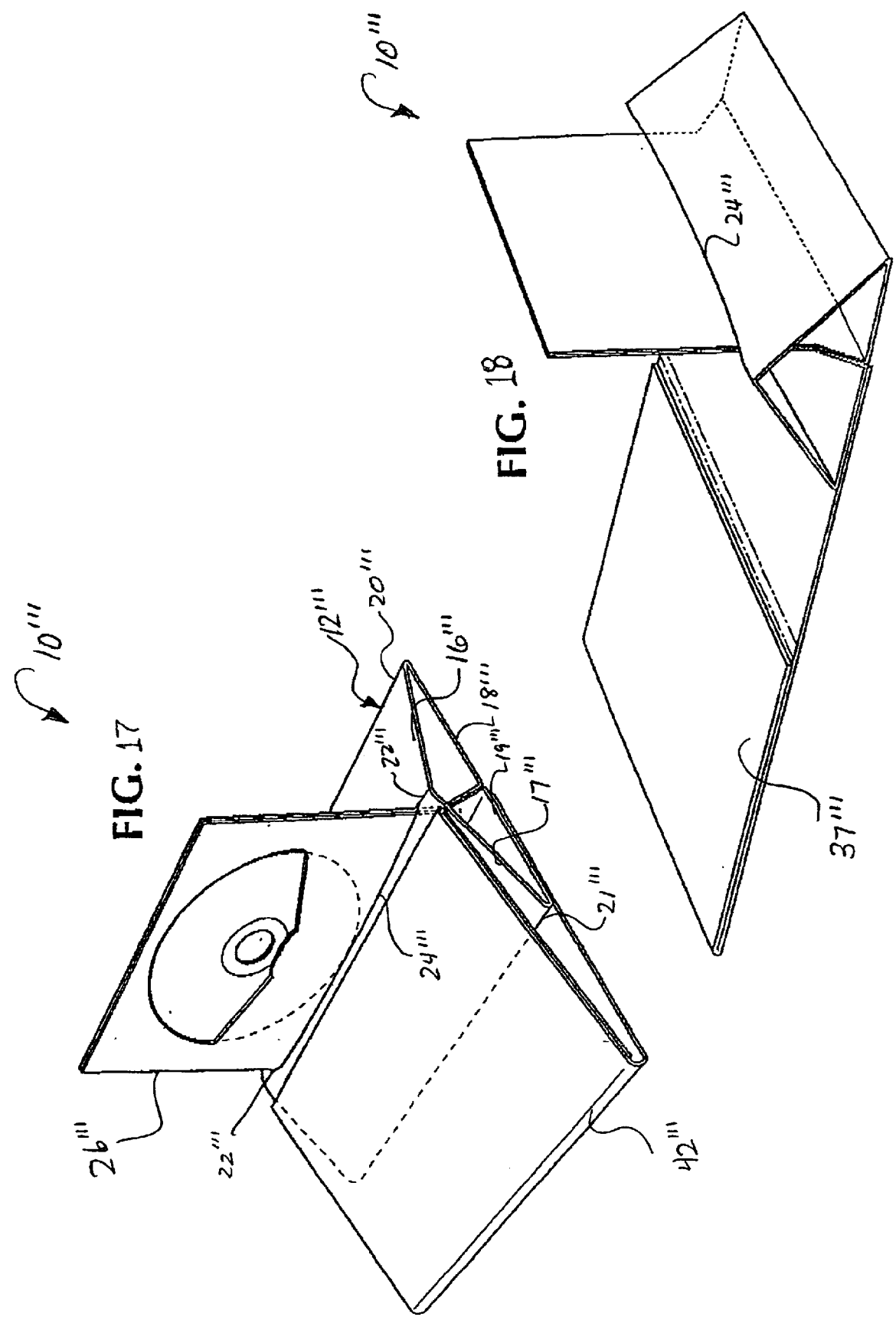

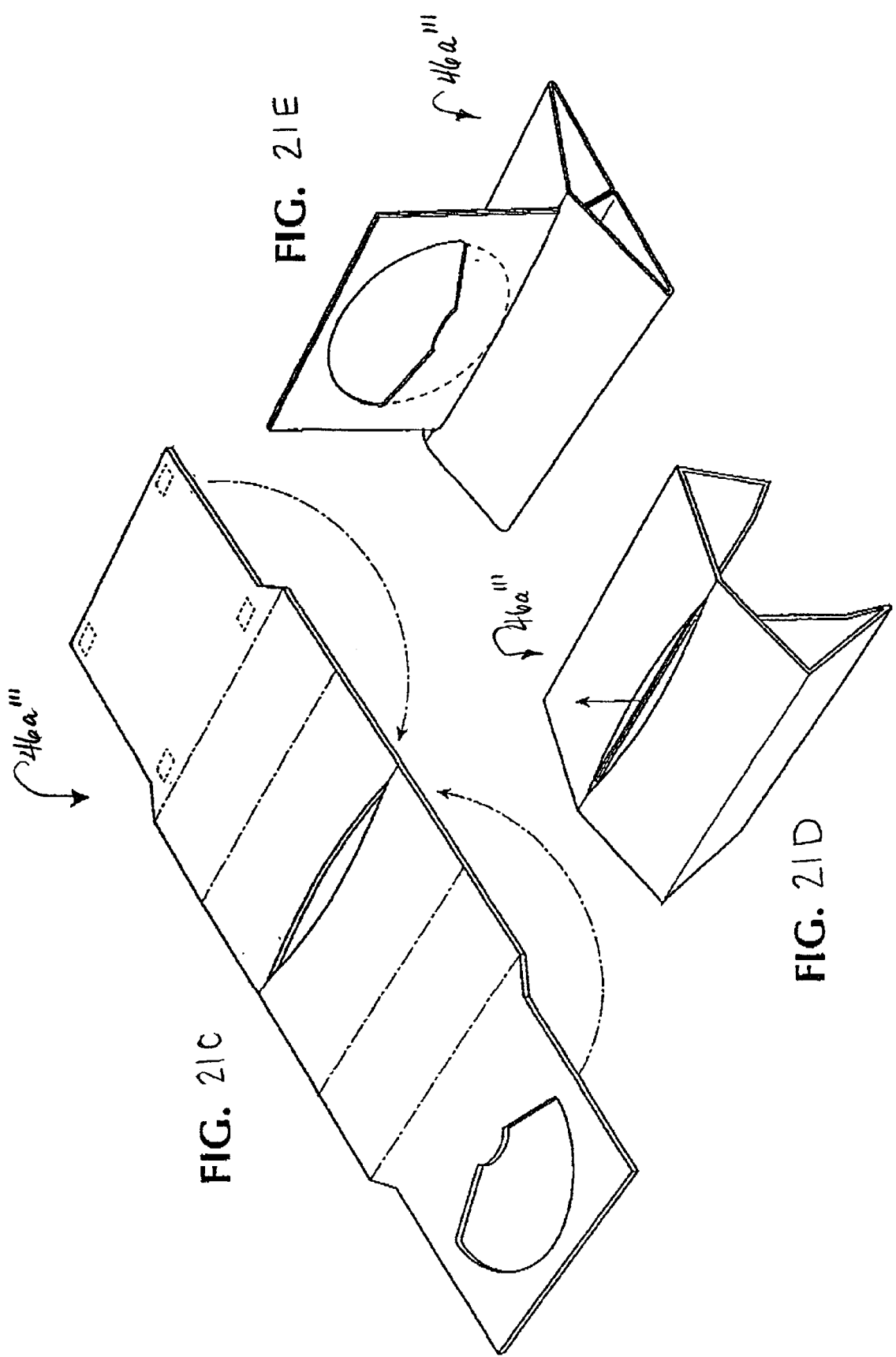

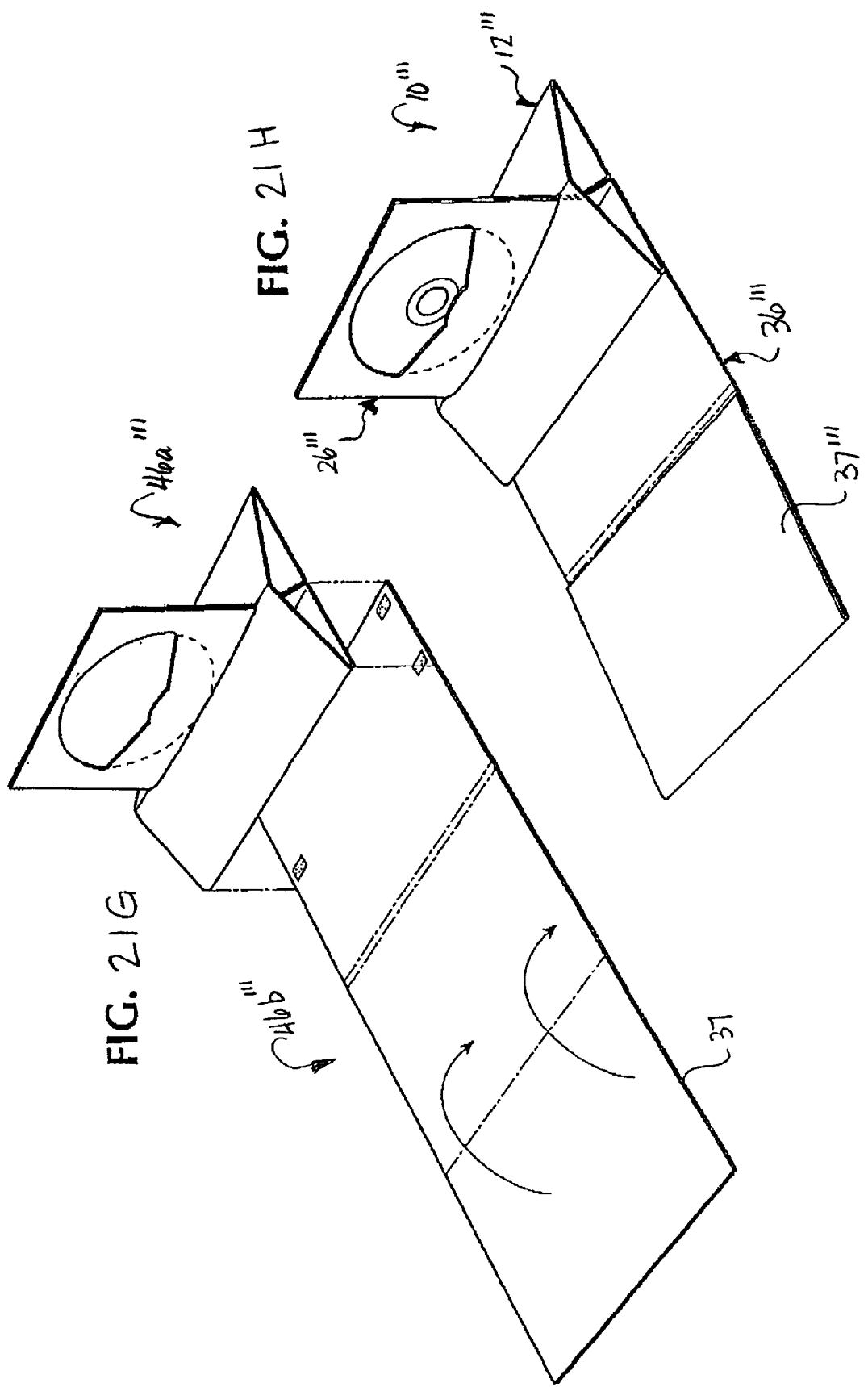

PACKAGING FOR RECORDABLE MEDIA

CROSS-REFERENCE TO RELATED APPLICATIONS

The present application is a continuation-in-part of U.S. patent application Ser. No. 09/723,738, filed Nov. 28, 2000, which has now issued as U.S. Pat. No. 6,505,737, which is hereby incorporated by reference.

TECHNICAL FIELD

The invention relates to packaging for displaying, storing and shipping recordable media items, including CDs, DVDs, software, electronically-stored photos on, for example CDs, and the like.

BACKGROUND

CDs are typically packaged in jewel cases. Jewel cases are usually made of rigid plastic. A jewel case typically has a spine which allows information concerning the CD contained inside it to be displayed when the case and its contents are stored, or displayed on retail shelves. Ordinarily, multiple CDs are shipped in their jewel cases in a larger shipping box which protects the jewel cases during shipping. Jewel cases are often much larger and heavier (i.e., bulkier) than the CDs held within them. In addition, jewel cases tend to cost more than they should because they tend to be oversized. Disadvantages of jewel cases are that they take up significantly more retail shelf space than necessary, use of a shipping box is preferred to minimize breakage during shipping, and they tend to cost more to ship than they should because they are bulkier than they need to be.

DVDs are ordinarily packaged in cases typically made out of vinyl or other relatively soft plastic and/or paperboard cases. Like jewel cases, DVD cases are ordinarily much larger and heavier (i.e., bulkier) than the DVDs held within them. Thus, disadvantages of DVD cases, like jewel cases, is that they take up significantly more retail shelf space than necessary, and they tend to cost more to ship than they should because they are bulkier than necessary.

Software is ordinarily packaged in flat sleeves. Accompanying software manuals are typically packaged with the sleeves in a larger, outer box with added packaging materials. Software boxes containing the sleeve and manual are preferably shipped in larger shipping boxes to avoid damage. Disadvantages of software boxes, as with jewel and DVD cases, is that they typically take up significantly more retail shelf space than necessary, and tend to be costly to ship.

Photographs are ordinarily packaged in envelope-type pouches. Electronically-stored photographs, electronically-stored on for example CDs, diskettes and cards containing electronically stored photographs are stored in the envelope-type pouches with the photographs. Disadvantages of envelope-type pouches typically do not provide sufficient protection for shipping, and do not provide display.

Display packaging is available which can be used to display one or more media items, such as CDs, DVDs, software disks, and the like. One type of display packaging is described in U.S. Pat. Nos. 5,641,063, 6,059,101, 5,901,844, 5,901,843, which are hereby incorporated by reference. Such packaging is usually constructed from heavyweight paper. This packaging tends to be smaller and lighter than jewel and DVD cases, and software boxes. In addition, since such packaging is typically constructed of heavyweight paper, it tends to be unbreakable, unlike jewel cases.

Such display packaging may be constructed with a pocket for inserting the CD, DVD, software disk or the like which has an edge, the upper portion of which is generally linear, be it generally horizontal or slanted or angled, or generally linear with a notch in the center thereof. The lower portion of the edge, which forms the bottom of the pocket, is generally in the shape of a sector of a circle so as to conform to the shape of the bottom portion of the CD, DVD, or software disk placed therein. The lower portion tends to hold the CD, DVD or software disk placed therein from its bottom. The lower portion can also have embossments to further aid in holding the CD, DVD or software disk placed therein from its bottom. Typically the CD, DVD, or software disk is not held from its top. The pocket typically does not open very widely or is difficult to open very widely, and tends not to allow for easy or automatic insertion of CDs, DVDs, software disks and/or the like.

In addition, this packaging typically does not have a spine. It also does not typically have an elongate member such that it can enfold the package, provide added advertising space for retail display advertising, and provide added protection during shipping. Moreover, display packaging tends to be capable of holding and displaying CDs, DVDs, software disks and the like, but not bulkier items, such as software manuals, multiple CDs or DVDs, or photographs, due to space and construction limitations.

Thus, disadvantages of this display packaging include that, when stored or displayed on retail shelves, information concerning the content of the packaging typically cannot be viewed by or is not visible to customers because this packaging typically does not have a spine. Another disadvantage is that CDs, DVDs, software disks and the like typically cannot be easily inserted, whether by hand or by automated equipment, into the pocket. A further disadvantage is that such display packaging also tends to require additional packaging when shipped to avoid damage to its contents. Moreover, this display packaging does not allow software manuals, photographs, or other bulkier items to be shipped with the CD, DVD, software disks and the like.

A further disadvantage of jewel cases and prior art display packaging typically require unduly complex automated processes for their assembly or to insert the CD, DVD, software disk and the like therein. DVD cases and software boxes typically require hand assembly because they are usually constructed from multiple pieces and/or are of such a design that the DVDs or disks, manuals and other packaging material cannot be easily or automatically inserted in the package.

What is desired, therefore, is a packaging system for CDs, DVDs, software and the like ("media item") that can be used to display media items, yet which takes up relatively little retail shelf space, is relatively light weight and durable, and which allows information concerning the contents of the system to be viewed when the system is stored on retail shelf space or is otherwise stored. What is also desired is a display packaging system that is relatively small, light weight and durable, yet which provides added protection during shipping. What is still further desired is a display packaging system that is relatively small, light weight and durable, yet which allows the media item to be inserted relatively easily either manually or using relatively simple automated equipment. Further desired is a display packaging system that is relatively small, light weight and durable, yet one in which bulky items, such as software manuals, photographs, pamphlets, and the like, can be packaged.

SUMMARY OF THE INVENTION

Accordingly, an object of the invention is to provide a packaging system which can display media items stored inside, yet which takes up relatively little retail shelf space, is durable and allows information to be displayed thereon, which is visible, when the packaging system is stored on a retail shelf.

Another object of the invention to provide a display packaging system which takes up relatively little retail shelf space, is relatively small and light weight, yet is durable, and provides added protection during shipping.

A further object of the invention is to provide a display packaging system which takes up relatively little retail shelf space, is relatively small and light weight, yet is durable, and allows for relatively easy insertion of the media items using, for example, relatively simple automated assembly equipment.

Yet a further object of the invention is to provide a display packaging system which takes up relatively little retail shelf space, is relatively small and light weight, yet is durable, and allows bulky manuals, photographs, pamphlets, and the like to be packaged with the CDs, DVDs, software disks and the like packaged therein.

Other objects of the invention will be obvious and may in part appear hereinafter.

These and other objects, features and advantages of the invention are achieved by providing a packaging system for media items (e.g., CDs, DVDs, software disks and the like), which includes a base having upper and lower panels with outer and inner ends, the inner ends having central portions. The panels are hingedly connected together along their respective outer and inner ends. The central portions of the inner ends are spaced apart from each other to define therebetween an elongate slot. The packaging system also includes an upright body connected to the base and extending upwardly therefrom through the slot. The body has a plurality of opposing panels which defines a pocket having a shape such that it is capable of receiving and holding the media item. The system also has an elongate member connected to the base with a construction such that the elongate member is capable of enfolding the base, and has a face which provides added stiffness and durability. The base and upright body have a construction such that the base is capable of encompassing the upright body, and is capable of resting on a generally flat surface thereby supporting and displaying the upright body, yet the outer panel ends are capable of moving below the upright body while displaying the upright body.

Preferably, the packaging system also has a spine. More preferably, the elongate member has two panels and the spine is hingedly connected between the elongate member panels such that the spine is adjacent to the inner ends of the base when the base is collapsed and the elongate member enfolds the base. Even more preferably, the packaging system also has a pouch which is connected to the elongate member such that the pouch is capable of enfolding over the base. It is also desirable to have the pocket which has a lower opening that has a nonlinear shape, and even more preferably the pocket edge has opposing ends which terminate in holes.

The invention and its particular features will become more apparent from the following detailed description considered with reference to the accompanying drawings.

BRIEF DESCRIPTION OF THE DRAWINGS

FIG. 4A is a plan view of a blank used to form the embodiment shown in FIG. 1;

FIG. 4B is a perspective view of the blank shown in FIG. 4A being assembled;

FIG. 4C is a perspective view of the assembly shown in FIG. 4B being further assembled;

FIG. 4D is a perspective view of the assembly shown in FIG. 4C being still further assembled;

FIG. 6A is a plan view of a blank used to form the embodiment shown in FIGS. 5A and 5B;

FIG. 6B is a perspective view of the blank shown in FIG. 6A being assembled;

FIG. 6C is a perspective view of the assembly shown in FIG. 6B being further assembled;

FIG. 6D is a perspective view of the assembly shown in FIG. 6C being still further assembled;

FIG. 9 is a plan view of a blank used to form the embodiment shown in FIG. 8;

FIG. 10 is a plan view of a blank used to form the embodiment shown in FIG. 11;

FIG. 12 is a perspective view of yet another embodiment of the packaging system in a display position;

FIG. 13 is another perspective view of the embodiment shown in FIG. 12 in another display position;

FIGS. 15C–H are perspective views of the blanks shown in FIGS. 15A and 15B being assembled;

FIGS. 17–22 depict yet another embodiment of the packaging system in views comparable to those depicted in the foregoing figures.

DETAILED DESCRIPTION

Figure 1:
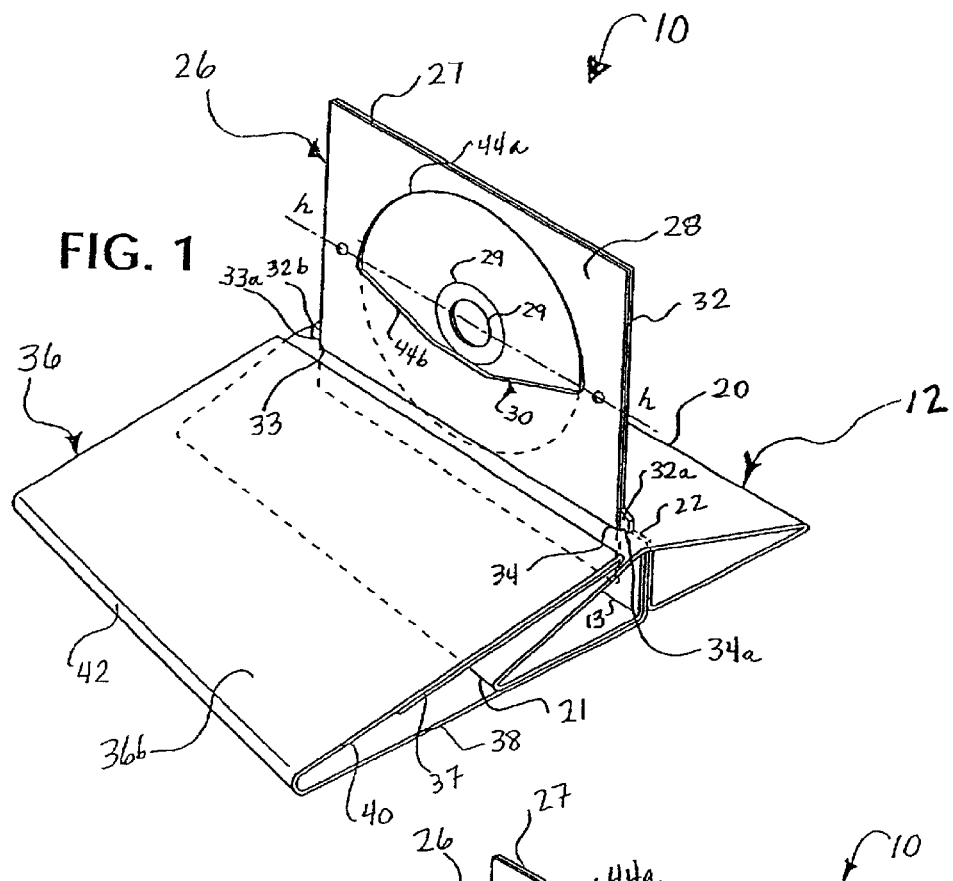
FIG. 1 is a perspective view of an embodiment of the packaging system in display position.
Figure 2:
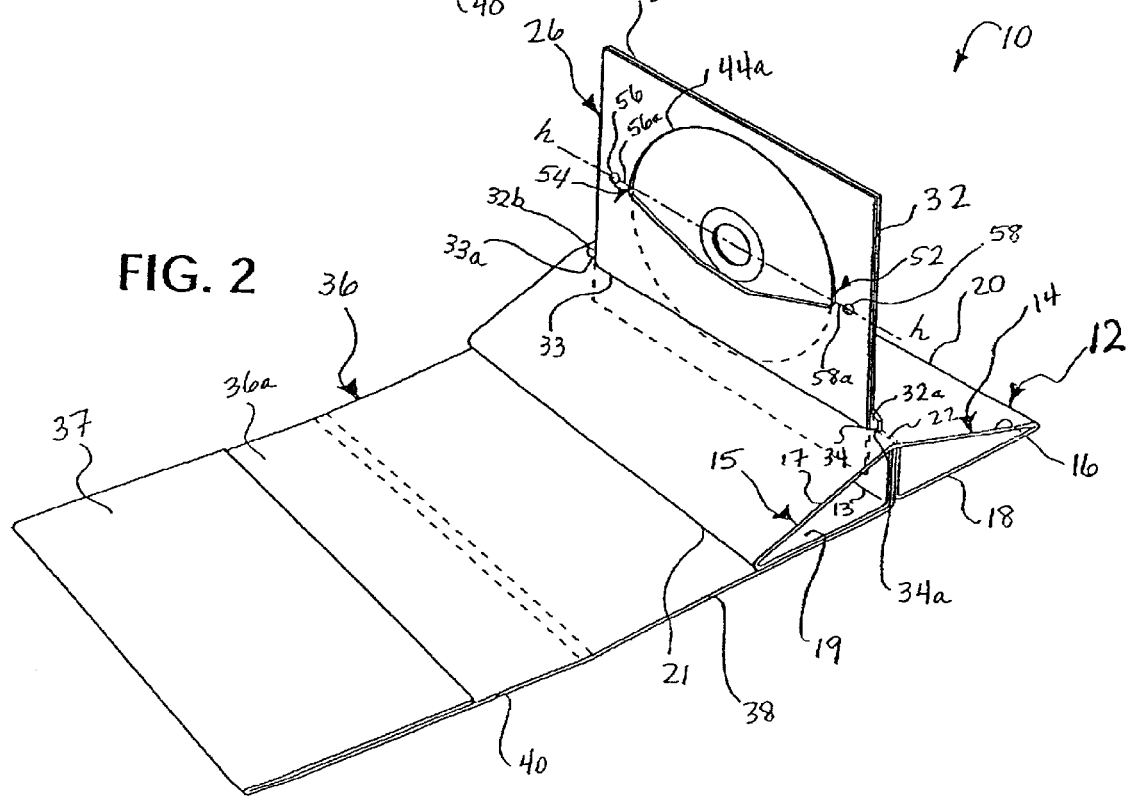
FIG. 2 is another perspective view of the embodiment shown in FIG. 1 in another display position.
Figure 3A:
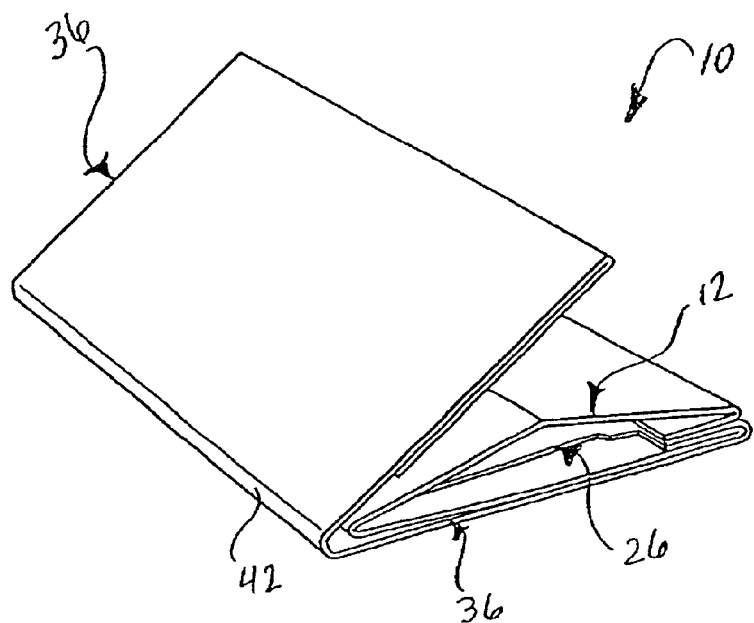
FIG. 3A is a perspective view of the embodiment shown in FIG. 1 in an enfolded and collapsed position.
Figure 3B:
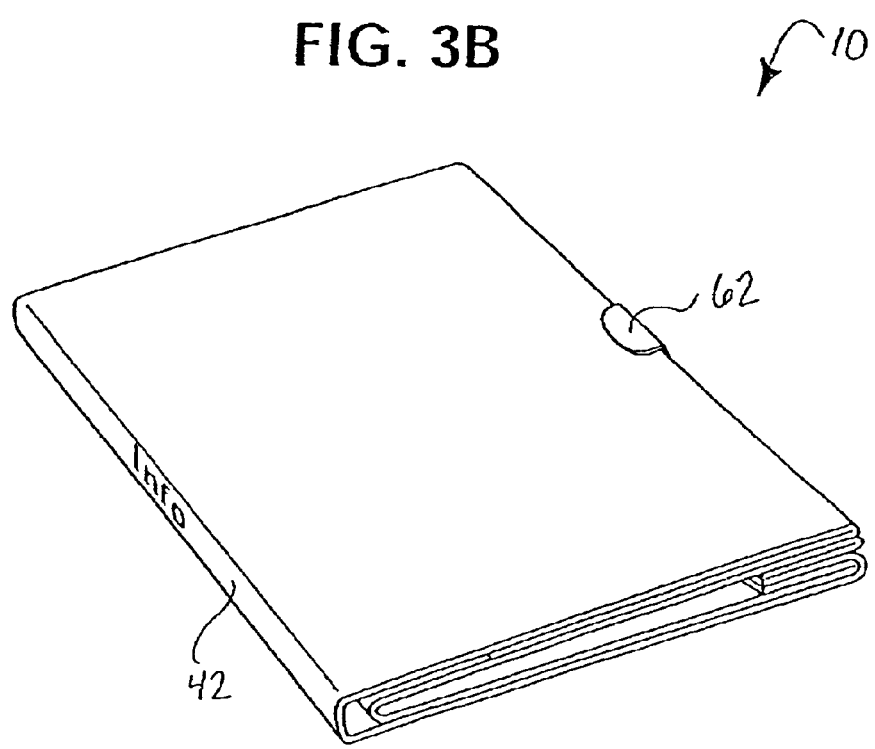
FIG. 3B is a perspective view of the embodiment shown in FIG. 1 in its completely enfolded and collapsed position.

FIGS. 1–2, 3A–B, and 4A–D depict a packaging system 10 including a base 12, an upright body 26 that holds CDs, DVDs, software and the like and is connected to base 12 at foldline 13, and an elongate member 36. Base 12 and upright body 26 are constructed such that they communicate with each other to provide packaging system 10 with collapsed positions and display positions. Elongate member 36 cooperates with base 12 and upright body 26 such that it enfolds base 12 when it is collapsed and extends or folds so as to allow advertising information on the outside or the inside of elongate member 36, whichever is desired, to be viewed. A collapsed position of base 12 and an enfolded position of elongate member 36 are shown in FIGS. 3A and 3B. Display positions are shown in FIGS. 1 and 2.

CDs, DVDs, software disks and the like are referred to collectively herein as "a media item." "Media item" also may include, for example, 35 mm photos, photo-CDs, software pamphlets, booklets, credit cards, computer cards/chips and other planar items. "Media item" shall also be understood to include plural forms of the phrase.

Base 12 has opposing halves 14, 15 which are each formed from a pair of spaced apart upper 16, 17 and lower 18, 19 panels. The upper and lower panels 16, 17, 18 and 19 are hingedly connected together along their inner ends 22, and their outer ends 20, 21. The inner ends 22 are spaced apart from each other in their central portion to define an elongate slot 24 therebetween.

Upright body 26 is connected to base 12 such that it is capable of extending upwardly from base 12 and through slot 24. Body 26 includes a plurality of opposing panels 28 which define at least one pocket 30. Pocket 30 is adapted so that it can relatively easily receive media items. At least one of opposing panels 28 has an elongate vertical edge portion 32 having a considerable length and being arranged such that it extends outwardly and downwardly in diverging relation to slot 24. Elongate vertical edge portion 32 is constructed such that it communicates with slot 24 in progressively increasingly frictional engagement with proximal end portions 33 and 34 of slot 24. This increasing frictional engagement with slot 24 by proximal end portions 33 and 34 maintains packaging system 10 in a display position. Elongate vertical edge portion 32 may have shoulders 32a and 32b, for example as shown in FIGS. 1 and 2, which engage end portions 33 and 34 and maintain packaging system 10 in a display position.

Elongate member 36 may be connected to base 12 or upright body 26. Elongate member 36 is preferably connected to base 12 between the opposing halves 14, 15 at foldline 13. Elongate member 36 has at least two panels 38, 40 which are hingedly connected to each other and of such a length that elongate member 36 is capable of enfolding base 12 when base 12 is collapsed, as shown in FIGS. 3A and 3B.

Packaging system 10 preferably has a spine 42 connected such that information may be displayed thereon while packaging system 10 is stored. For example, spine 42 allows information printed thereon to be visible by a customer or other individual when packaging system 10 is stored on a retail shelf, or in a CD rack. "Spine," as used herein, means a generally flat area having a height that is significantly smaller than its width, yet which height is sufficient to display information thereon. Thus, the construction and orientation of the spine 42 is such that information printed thereon is visible when the packaging system 10 is stored, for example, on retail shelves.

Elongate member 36 further has face 37, as shown in FIG. 2, which provides added protection during shipping. Preferably face 37 extends to spine 42 to impart added strength and durability to elongate member 36.

Elongate member 36 may also be provided with printed information, such as advertising. This printed information may appear on the inside 36a or outside 36b of elongate member 36. Printed information on the outside 36b of elongate member 36 may be viewed when packaging system 10 is in the display position shown in FIG. 1 or in enfolded positions shown in FIGS. 3A and B. Printed information on the inside 36a of elongate member 36 may be viewed when packaging system 10 is in the display position shown in FIG. 2, for example.

Pocket 30 has an edge 44 that defines upper and lower openings 44a and 44b respectively, as depicted in FIGS. 1 and 2. Upper and lower openings 44a and 44b are generally defined by horizontal reference line h; upper opening 44a comprises pocket edge 44 lying above reference line h and lower opening 44b comprises pocket edge 44 below reference line h. Reference line h may, but is not required to, bisect the media item placed in pocket 30. Upper opening 44a generally conforms to the shape of the media item to be held in pocket 30. For example, as shown in FIGS. 1 and 2, upper opening 44a is semicircular and generally sized so as to conform to the upper portion of a CD, DVD, or software disk placed therein. By way of further example, for a generally rectangular media item, upper opening 44a may be generally rectangular so as to conform to the perimeter of the media item projecting above horizontal reference line h. Upper opening 44a tends to hold the media item in pocket 30 and prevent it from falling out, if packaging system 10 is turned on its end 27.

Lower opening 44b generally has a shape that is nonlinear. For example, as shown in FIGS. 1 and 2, lower opening 44b is nonlinear and is comprised of a plurality of linear segments. Lower opening 44b" or 44b'" may, but is not required to, be curvedly or crescent shaped, as shown in FIGS. 8–11. Generally, lower opening 44b shall not have a shape which conforms to the shape of the portion of the media item held in pocket 30 below horizontal reference line h. Lower opening 44b allows the media item to be more easily inserted into pocket 30 than a lower opening which has a linear shape, yet allows the media item to be held in place. Thus, lower opening 44b generally allows pocket 30 to be opened wider than a pocket with a linear edge, while still holding the media item.

Pocket edge 44 also has opposing ends 52 and 54. Opposing ends 52 and 54 may have small holes 56 and 58 adjacent thereto. As shown in FIGS. 1, 2, 4A and 4B, opposing ends 52 and 54 may but are not required to terminate in perforations 56a and 58a disposed between edge 44 and holes 56 and 58, respectively. Opposing ends 52 and 54, small holes 56 and 58 and/or perforations 56a and 58a may lie along horizontal reference line h, but are not required to. Small holes 56 and 58 and perforations 56a and 58a, alone and/or together, provide for even easier insertion of a media item into pocket 30 by allowing pocket 30 to expand even wider than a pocket not having holes 56 and 58 and/or perforations 56a and 58a, while still adequately holding the media item after it has been inserted. Holes 56 and 58, perforations 56a and 58a, and lower opening 44b are also advantageous because they generally allow thicker and/or multiple CDs, DVDs, software disks and the like to be inserted in pocket 30.

The plurality of opposing panels 28 that form pocket 30 may have one or more embossments 29, for example, to conform to the side of a media item placed in pocket 30. This allows the media item to be more snugly held within pocket 30.

Figure 5A:
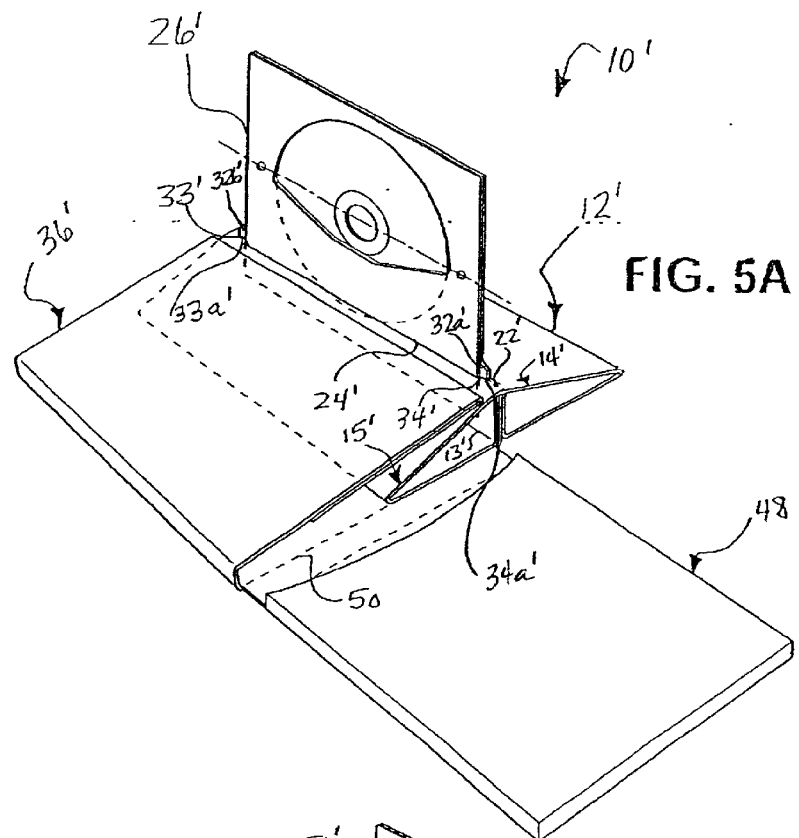
FIG. 5A is a perspective view of another embodiment of the packaging system in a display position.
Figure 5B:
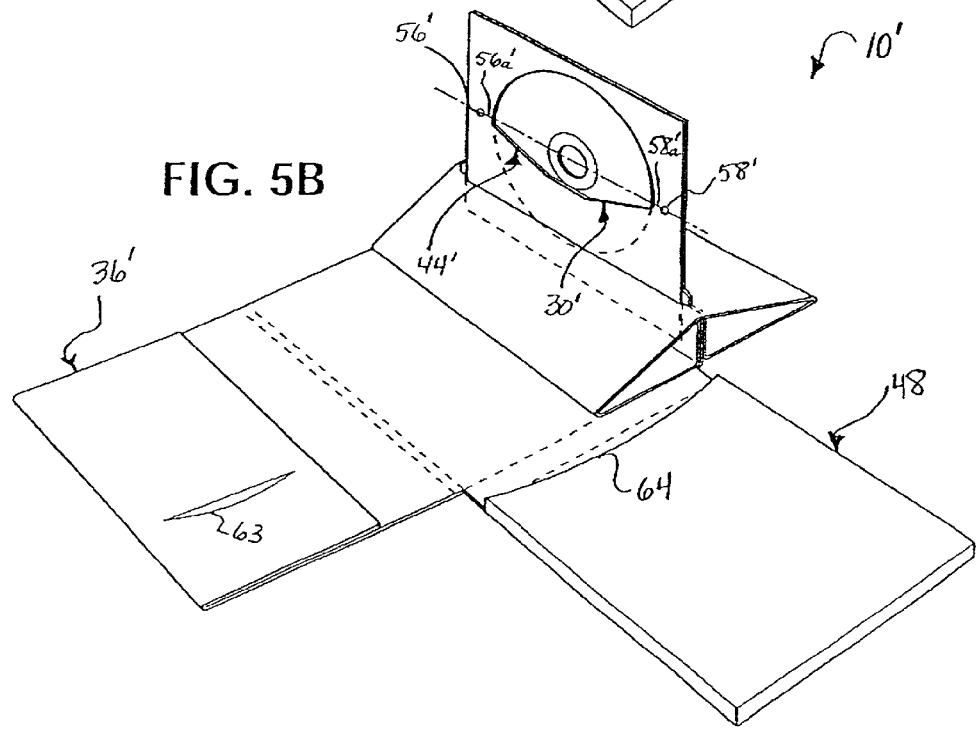
FIG. 5B is a perspective view of the embodiment shown in FIG. 5A in another display position.
Figure 6E:
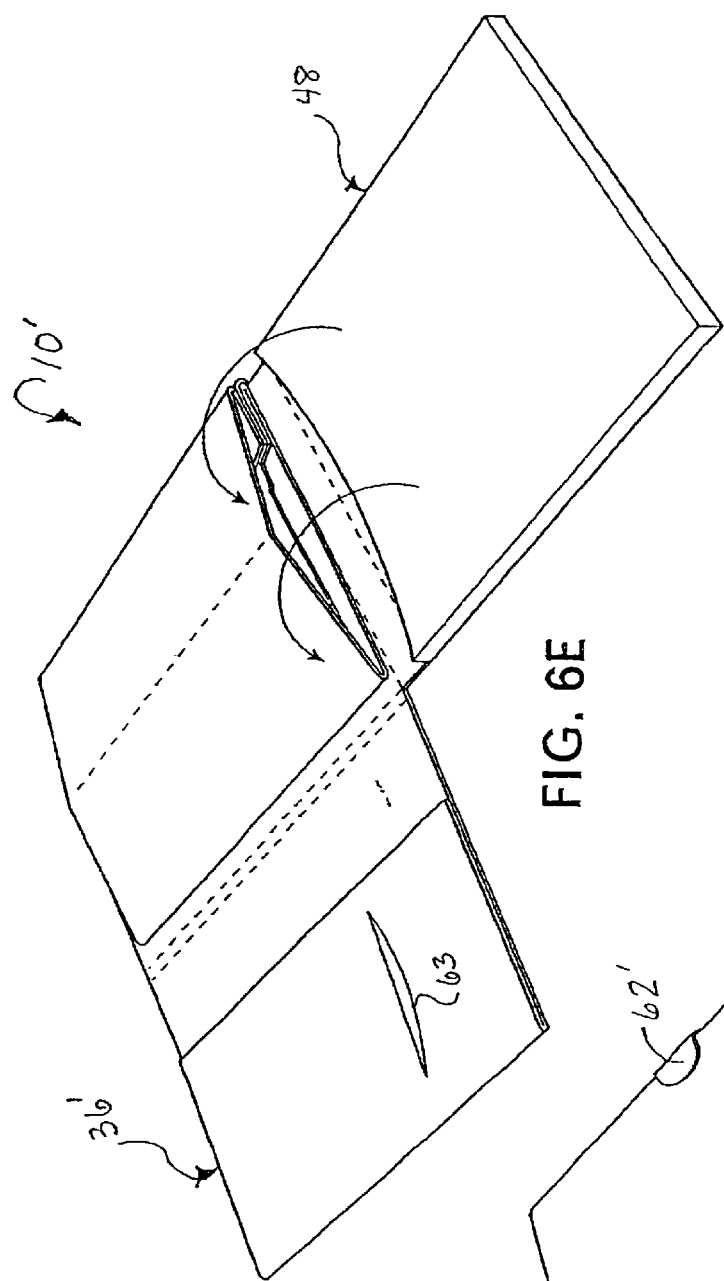
FIG. 6E is a perspective view of the assembly shown in FIG. 6D being folded.

Packaging system 10' is also provided as shown in FIGS. 5A–B, 6A–E and 7. Packaging system 10' generally has the features and functions described above relative to packaging system 10, but also includes pouch 48 for holding bulky items, such as one or more software manuals, promotional items, pamphlets, photographs and other items. Pouch 48 has a size such that it can hold such bulky items. Pouch 48 is connected to packaging system 10' so that it is capable of folding over base 12' when base 12' is in its collapsed position, as shown in FIG. 6E. Preferably, pouch 48 is hingedly connected to elongate member 36'. Elongate member 36' has elongate side 50 which is generally in a plane that is transverse to the plane in which upright body 26' lies. Pouch 48 preferably is connected to elongate side 50. This configuration allows pouch 48 to clear base 12' when it is folded over base 12'.

It is understood that pouch 48 may be connected to elongate member 36' at another edge or it may be connect directly to base 12'. Connecting pouch 48 directly to one end 66 of elongate member forming portion E' is referred to as being connected "in-line." Connecting pouch 48 in-line is generally preferable as it makes assembly of packaging system 10' easier, but would require the addition of one or more panels to blank 46'.

Packaging system 10', as a result of pouch 48, has a wall 60 adjacent to elongate side 50 or base 12', depending upon which it is connected to. Wall 60 may also have information displayed thereon, in addition to information displayed on spine 42'.

Packaging systems 10 and 10' may be held closed with seal 62, 62'. Seal 62, 62' can be any suitable sealing material, including a plastic tab, wafer seal or velcro. A wafer seal having a half moon shape in shown in FIGS. 3B and 7. Multiple seals may also be used, as appropriate.

Packaging systems 10 and 10' may be shrink wrapped. The shrink wrap encases the packaging systems 10 and 10' and protects them during shipment and handling. Typical shrink wrap is plastic and provides a moisture and/or vapor barrier against the elements. It is desirable for the wrap to be transparent or at least translucent so that the packaging systems 10 and 10' can be easily seen. The shrink wrap may be printed thereon or otherwise decoratively treated.

Packaging systems 10 and 10' may be formed from blanks 46 and 46', respectively, as shown in FIGS. 4A–D and 6A–E. FIG. 6E specifically shows that base 12' first folds over elongate member 36', and then pouch 48 folds over base 12'. Blanks 46 and 46' are generally unitary or comprised of a single piece of material, and are generally of uniform thickness. Packaging system 10, 10' may be formed from multiple blanks. Preferably, the material is paperboard. It is understood that a different quality, color, or gauge of paperboard or alternative materials, such as plastic or a light metal alloy, or a combination thereof, may be used to make blanks 46 and 46', so long as the material used is capable of being cut and folded to form packaging systems 10 and 10'. Preferably, the paperboard has an aqueous coating. It is also understood that a coating or other surface treatment need not be used at all or may only be provided on one side of the paperboard. The paperboard may also be printed, especially on spines 42 and 42'.

As depicted in FIGS. 4A and 6A, blanks 46 and 46' have base-forming portions B and B', upright body-forming portions U and U', and elongate member-forming portions E and E', respectively. Blank 46' also has pouch-forming portion P. Upright body-forming portions U and U' form pockets 30 and 30', with edges 44 and 44', respectively. Slots 24 and 24' are also shown in FIGS. 4A and 6A. FIGS. 5B and 6A–E further show edge 64 of pouch, and ancillary pocket opening 63. It is understood that, while pouch edge 64 and ancillary pocket opening 63 are shown having the shapes in FIGS. 5B and 6A–B, they can have any shape. Portions B, B', U, U', E and E' are formed from a plurality of serially arranged panels with hinged connections therebetween so as to correspond to panels and features described above relative to packaging systems 10 and 10'. The panels generally have rectangular configurations, but can have any configurations, including trapezoidal configurations. Hinged connections described herein are understood to include those formed by creasing, partially cutting, perforating or scoring the paperboard. Outer edges of blanks 46 and 46', slots 24 and 24', holes 56, 58, 56' and 58' and perforations 56*a*, 58*a*, 56*a*' and 58*a*' and any other slits desired may be die cut using a rule die or other die known to those of ordinary skill in the art.

Desirably blanks 46 and 46' are automatically assembled. Blanks 46 and 46' are assembled to form packaging systems 10 and 10' by glueing. Any type of glue may be used but preferably glue which may be used in automatic assembly equipment is used. Media items may also desirably be automatically inserted. By comparing FIGS. 4A–D and 6A–E, it can be seen how to glue and assemble packaging systems 10 and 10'. U.S. Pat. Nos. 5,641,063, 6,059,101, 5,901,844, and 5,901,843, which have been incorporated by reference, describe in detail methods for glueing and assembling a display packaging which can be used to glue and assemble blanks 46 and 46'.

Figure 7:
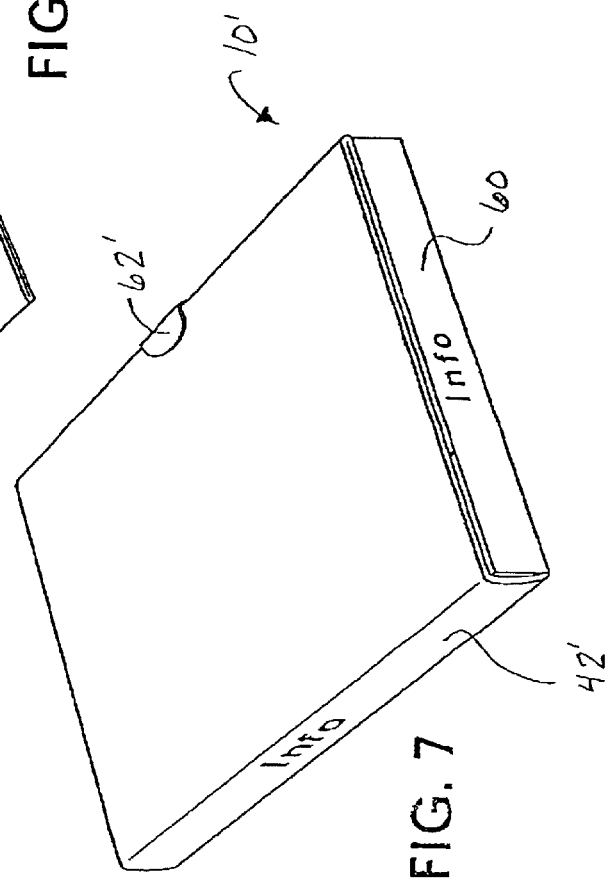
FIG. 7 is a perspective view of the embodiment shown in FIGS. 5A–B in its completely enfolded and collapsed position.
Figure 8:
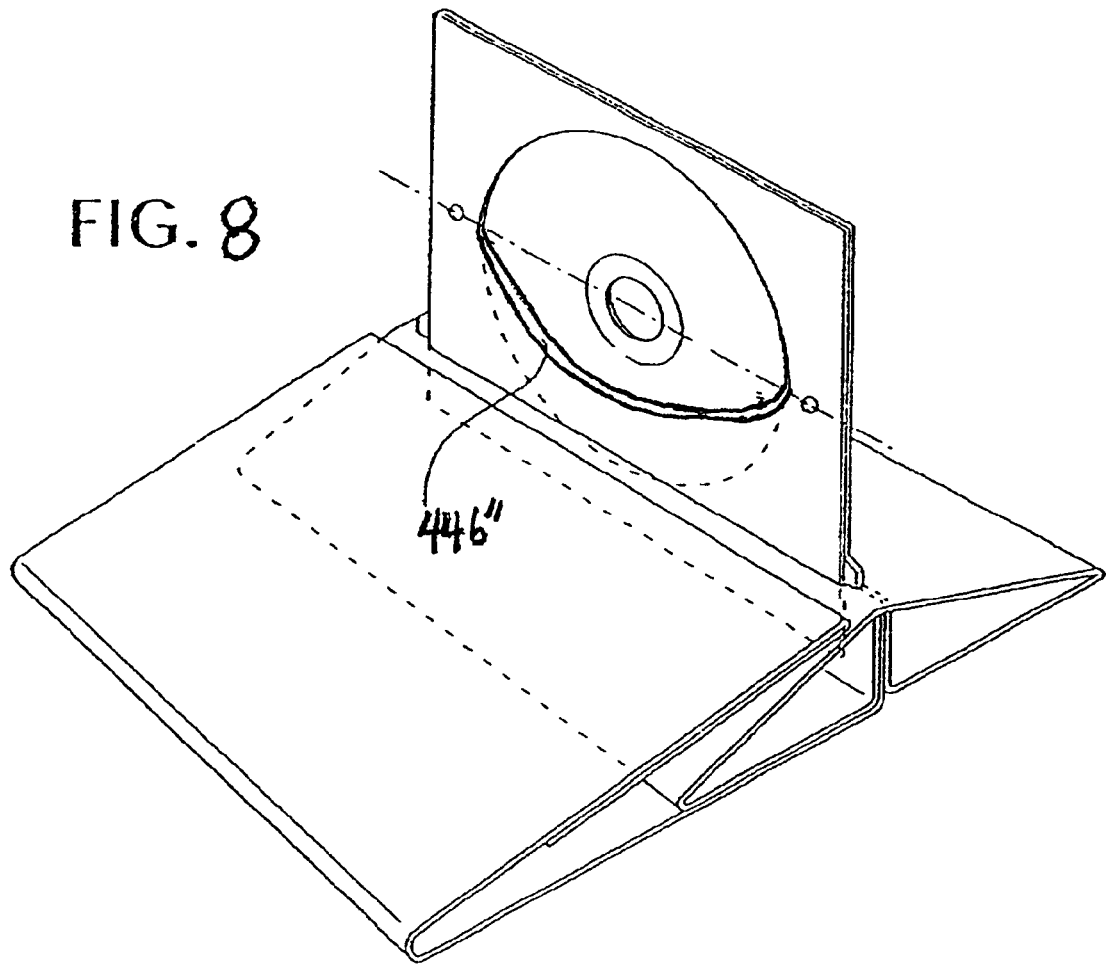
FIG. 8 is a perspective view of a yet another embodiment of the packaging system shown in display position.

FIGS. 1–3B show how to display and enfold packaging system 10 in preparation for shipping and/or storing. FIGS. 5A, 5B and 7 similarly show how to display and enfold packaging system 10'. To display the media item, upright bodies 26 and 26' extend upwardly from bases 12 and 12' through elongate slots 24 and 24'. To enfold packaging systems 10 and 10', base halves 14, 14', 15, and 15' are collapsed along foldlines 13 and 13' such that upright bodies 26 and 26' are substantially covered by bases 12 and 12', and elongate members 36 and 36' are enfolded around collapsed bases 12 and 12'. This ability of packaging systems 10 and 10' to move from a display position to a collapsed and enfolded position is provided by hingedly connecting elongate members 36 and 36' and upright bodies 26 and 26' to bases 12 and 12', respectively. It is understood that elongate members 36 and 36' and upright bodies 26 and 26' cooperate with bases 12 and 12'.

As shown in FIGS. 1, 2, 5A and 5B, upright bodies 26 and 26' communicate and interfere with elongate slots 24 and 24' so that packaging systems 10 and 10' are capable of remaining in a display position. This can be achieved, for example, by providing elongate slots 24 and 24' with slits 33*a*, 34*a* and 33*a*', 34*a*' at end portions 33, 34 and 33', 34', along inner ends of spaced apart upper and lower panels 22 and 22', and by providing bases 12 and 12' with shoulders 32*a*, 32*b*, 32*a*' and 32*b*' which correspond to the slits 33*a*, 34*a*, 33*a*' and 34*a*'. As discussed above, this can be achieved by providing upright bodies 26 and 26' with vertical edges which increase in outwardly and downwardly diverging relation to elongate slots 24 and 24', or by providing periodic notches, lances, or steps for holding bases 12 and 12' in multiple, predetermined, intermediate positions.

Figure 11:
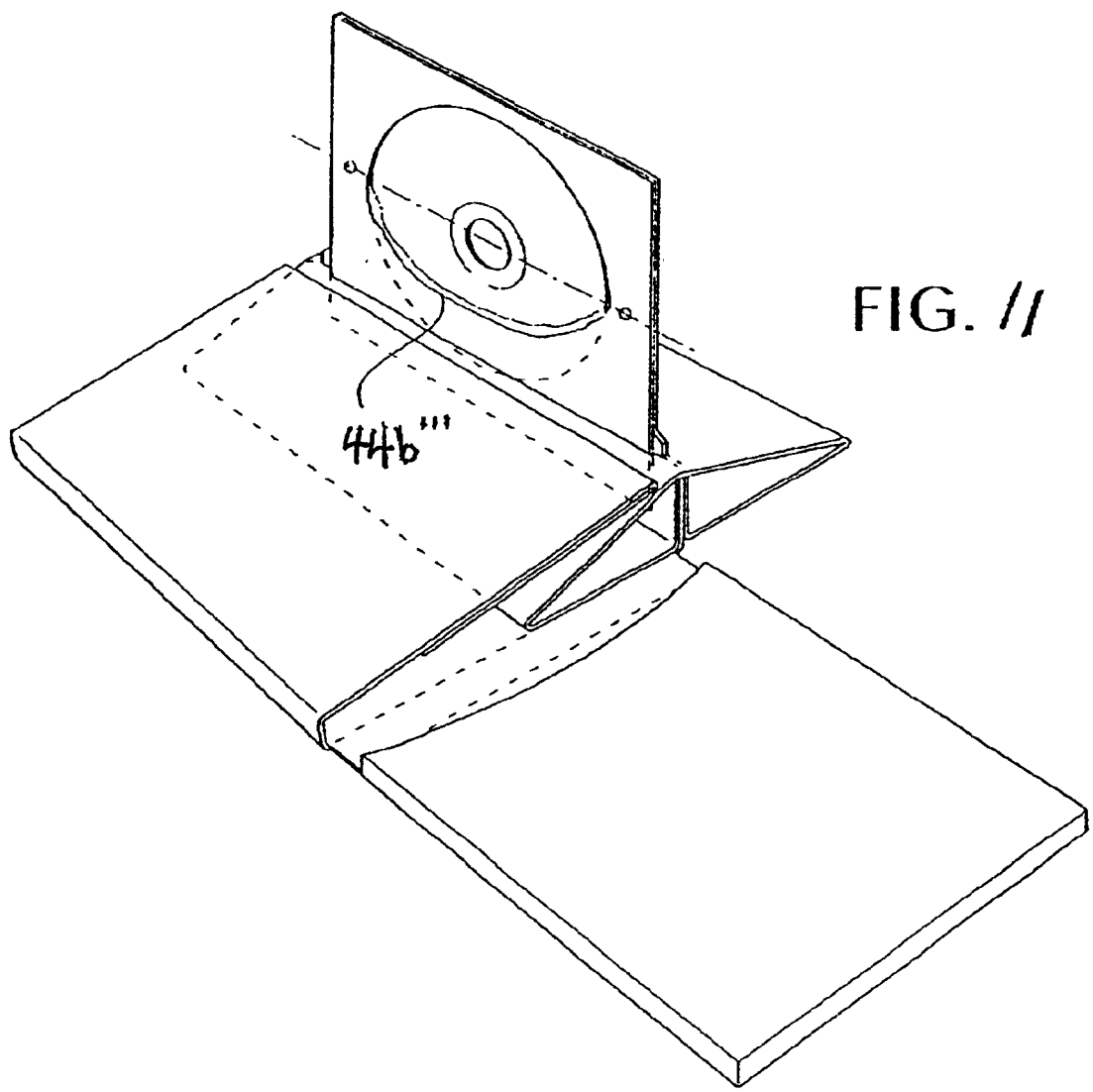
FIG. 11 is a perspective view of another embodiment of the packaging system in a display position.

Packaging system 10", shown in FIGS. 12–16, is further provided. Packaging system 10" generally has the features and functions described above relative to packaging system 10' and 10, except that while a base 12" and an upright body 26" are sized such that base 12" is capable of encompassing upright body 26', as in the previous packaging system embodiments 10, 10', and they are further constructed such that base 12" is capable of resting on a generally flat surface thereby supporting and displaying the upright body 26" yet panel outer ends 20", 21" are capable of moving below upright body 26" while displaying the upright body 26", unlike panel outer ends 20, 20', 21 and 21' of packaging system 10, 10'. FIG. 4 of U.S. Pat. Nos. 5,641,063, 6,059, 101, 5,901,844, 5,901,843, which have been incorporated by reference, and U.S. Pat. No. 3,549,225 to Scacci (Dec. 22, 1970) and British Pat. Spec. No. 881,755 to Hunneman (Nov. 8, 1961), which are hereby incorporated by reference, depict a construction allowing panel outer ends 20", 21" to extend below upright body 26" as described above. This construction is particularly advantageous in that it eliminates the need for shoulders 32a, 32b, 32a', and 32b' and slits 33a, 34a, 33a', and 34a'. Packaging system 10" has a pouch 48" capable of holding bulky items, such as photographs or pamphlets. Pouch 48" as shown in FIG. 13 is attached to elongate member 36" at its narrowest dimension opposite base 12". Pouch 48" may be attached to packaging system 10" at other locations which are not shown but are contemplated. For example, pouch 48" may be connected to the longest end of elongate member 36". In addition, pouch 48" may be constructed as shown in FIG. 11 such that it folds over on elongate member 36". Packaging system 10" further has a spine 42" as shown in FIG. 14B.

Base 12" has upper and lower panels 16", 17" with outer ends 20", 21" and inner ends 22". The panels 16", 17" and outer and inner ends 20", 21" and 22" are hingedly connected together as previously described. The central portions of the inner ends 22" are spaced apart from each other to define an elongate slot 24" therebetween.

Upright body 26" may be connected to base 12" and extends upwardly from base 12" through elongate slot 24". Upright body 26" comprises a plurality of opposing panels 28" defining a pocket 30" having a shape such that it is capable of receiving and holding media items. Pocket 30" has an edge 44" with an upper opening 44a" and a lower opening 44b". Pocket 30" may have holes and slits, such as holes 56, 58 and slits 56a, 58a, as shown, for example, in FIG. 1. Lower opening 44b" is generally nonlinear, and may be formed from a plurality of linear segments, such as lower opening 44b, as shown, for example in FIG. 1 or may be curved, such as lower opening 44b" as shown, for example, in FIG. 8.

Packaging system 10''' is also provided, as shown in FIGS. 17–22. Base 12''' and an upright body 26''' are sized such that base 12''' is capable of encompassing upright body 26''', as in the previous packaging system embodiments 10, 10', 10". Like packaging system 10", base 12''' and upright body 26''' are further constructed such that base 12''' is capable of resting on a generally flat surface thereby supporting and displaying the upright body 26''' yet panel outer ends 20''', 21''' are capable of moving below upright body 26''' while displaying the upright body 26''', unlike panel outer ends 20, 20', 21 and 21' of packaging system 10, 10'. This construction is particularly advantageous in that it eliminates the need for shoulders 32a, 32b, 32a', and 32b' and slits 33a, 34a, 33a', and 34a'. Upper base panels 16''', 17''' are significantly longer than lower base panels 18''', 19''' such that inner ends 22''' do not rest on base 12''' when packaging system 10''' is in its full display position displaying upright body 26'''.

Elongate member 36''' may also have a face 37''', as shown in FIG. 18, which adds stiffness as discussed above with respect to other embodiments. Packaging system 10''' further has a spine 42''' as shown, for example, in FIG. 20.

Packaging system 10, 10', 10" and 10''' may also include a locking system, which has an inserting arm protruding from one of inner edge of slot 24''', and at least one receiving portion in upright body 26''' for receiving inserting arm. Receiving portion and inserting arm communicate such that base 12''' and upright body 26''' are secured in a display position. An example of such a locking system is shown in British Patent Specification No. 881,755 to Hunneman (Nov. 8, 1961). Locking system may include multiple receiving portions to advantageously allow for multiple display positions. In addition, inserting arm may have a variety of shapes including rectangular, circular, arrow and tapered shapes.

Figure 14A:
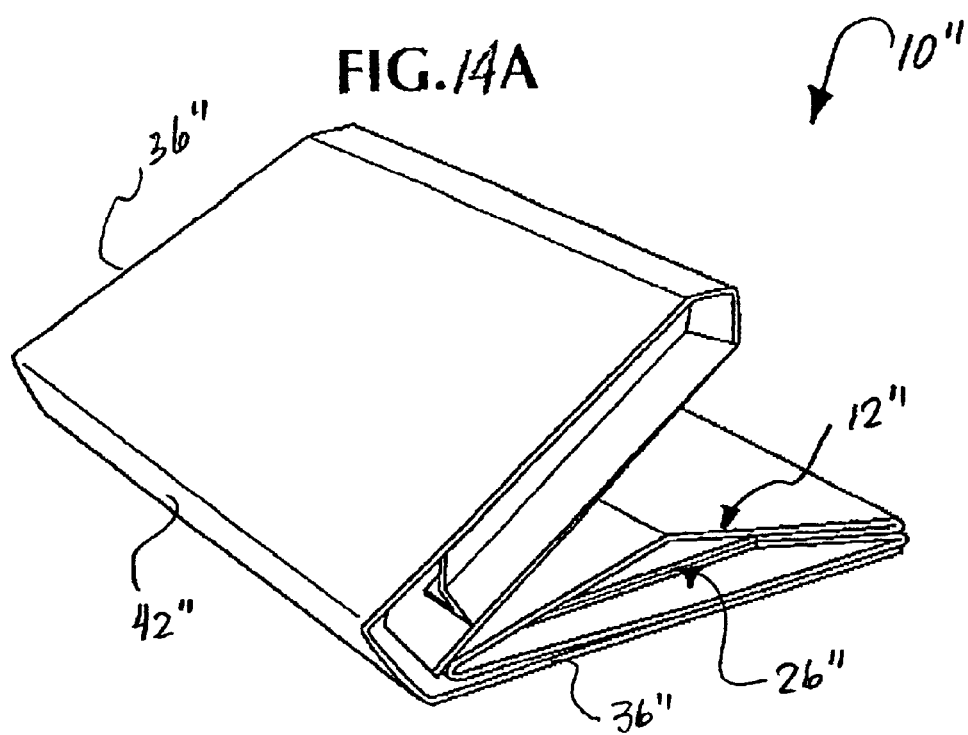
FIG. 14A is a perspective view of the embodiment shown in FIG. 12 in an enfolded and collapsed position.
Figure 14B:
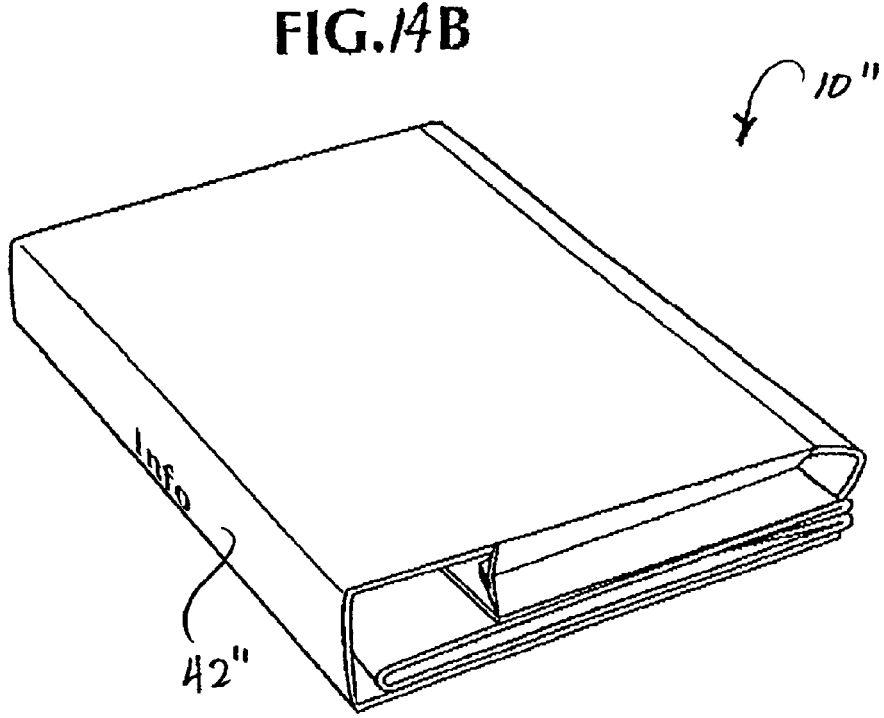
FIG. 14B is a perspective view of the embodiment shown in FIG. 12 in its completely enfolded and collapsed position.
Figure 15A:
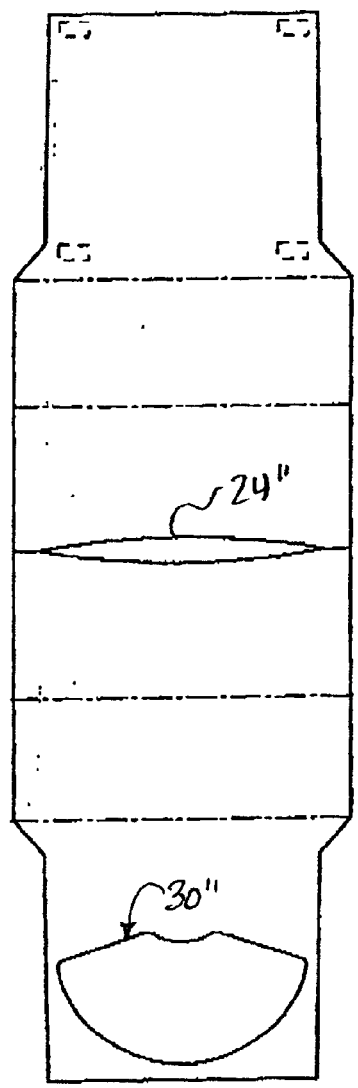
FIG. 15A is a plan view of a blank used to form the embodiment shown in FIG. 12.
Figure 15B:
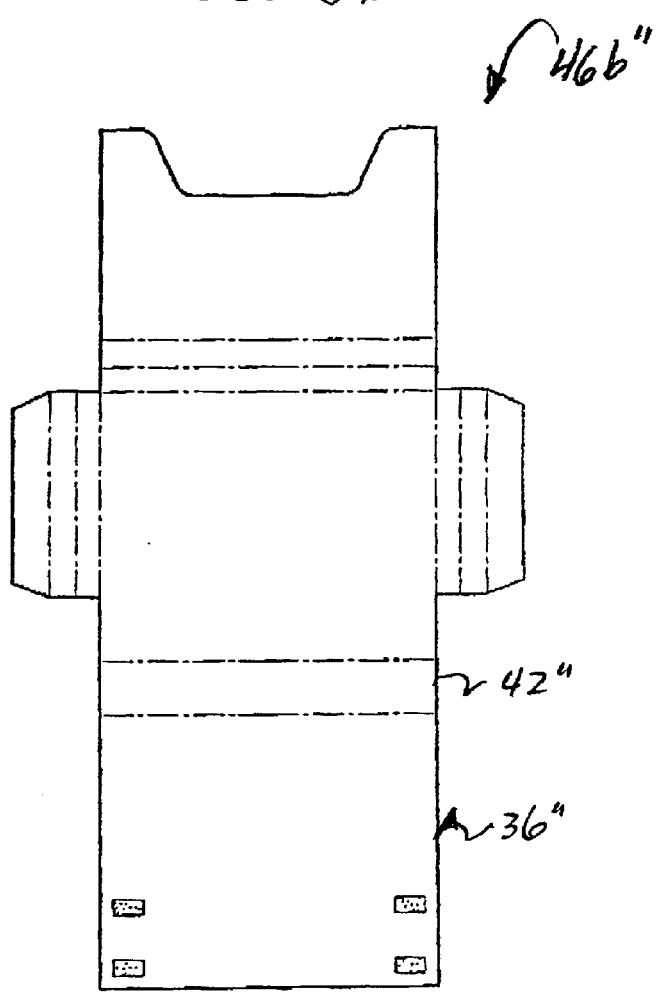
FIG. 15B is a plan view of another blank also used to form the embodiment shown in FIG. 12.
Figure 15F:
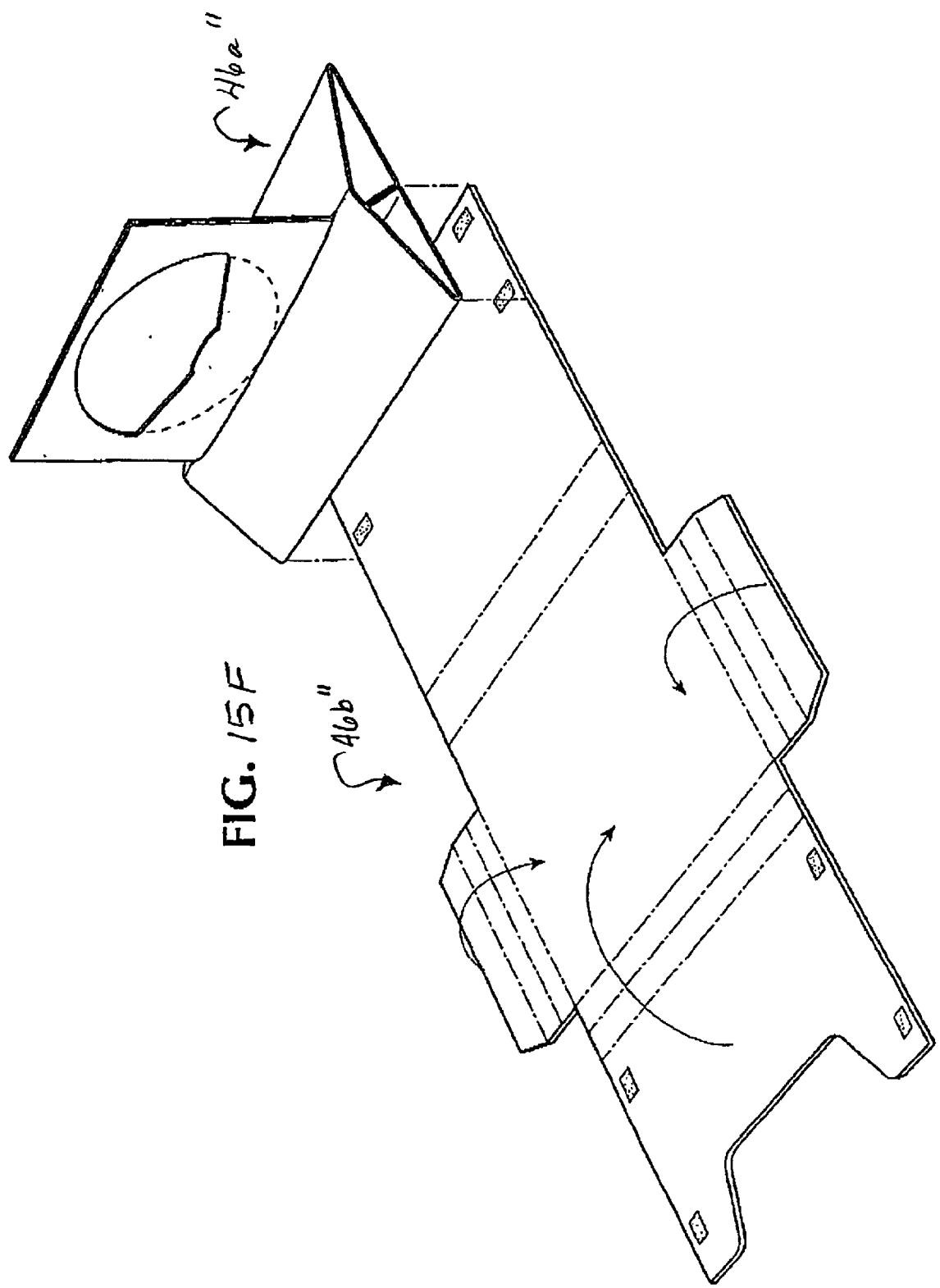
Figure 16:
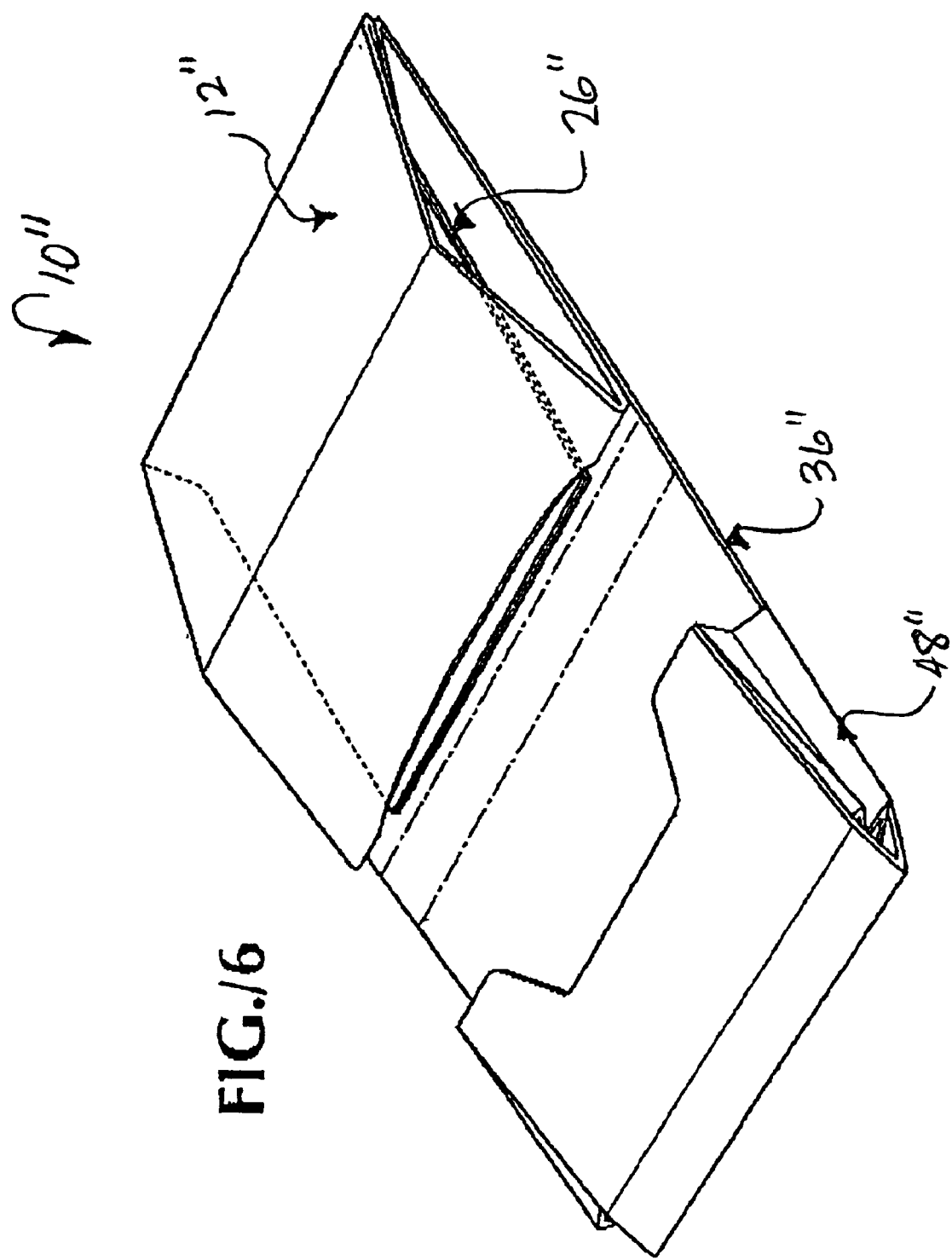
FIG. 16 is a perspective view of the embodiment shown in FIG. 12 in a collapsed position.
Figure 19:
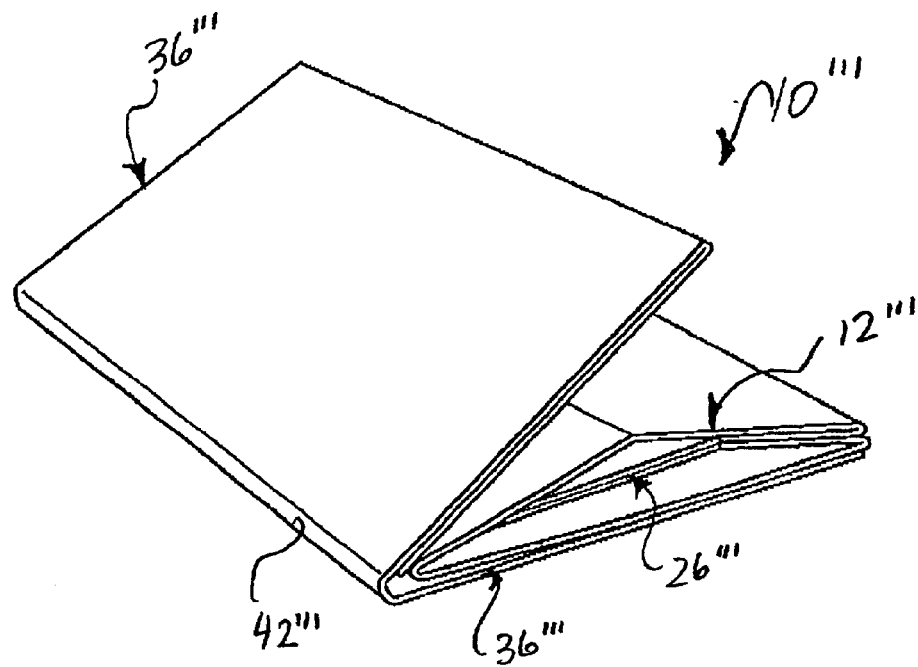
Figure 20:
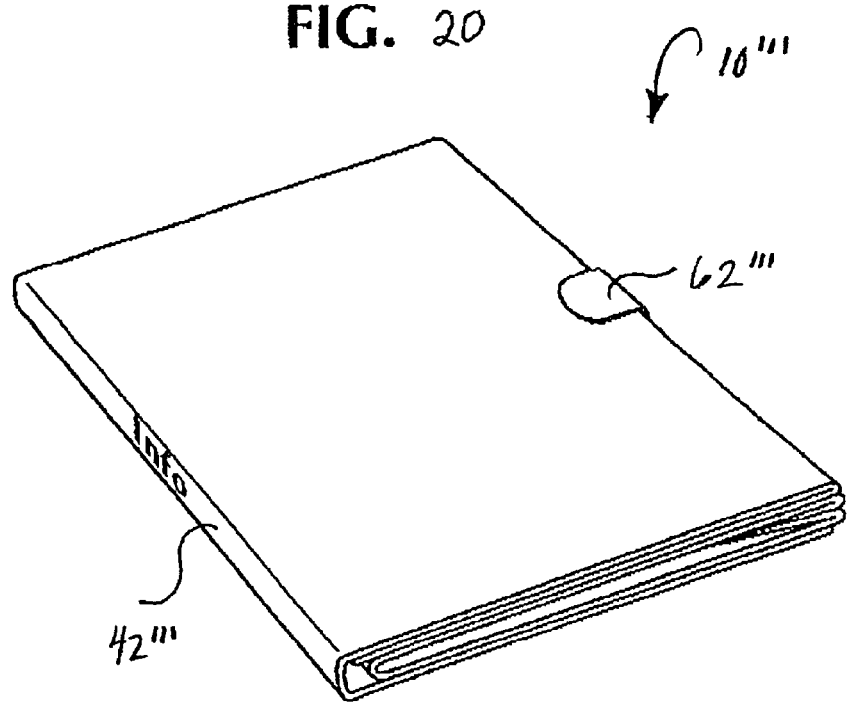
Figure 21A:
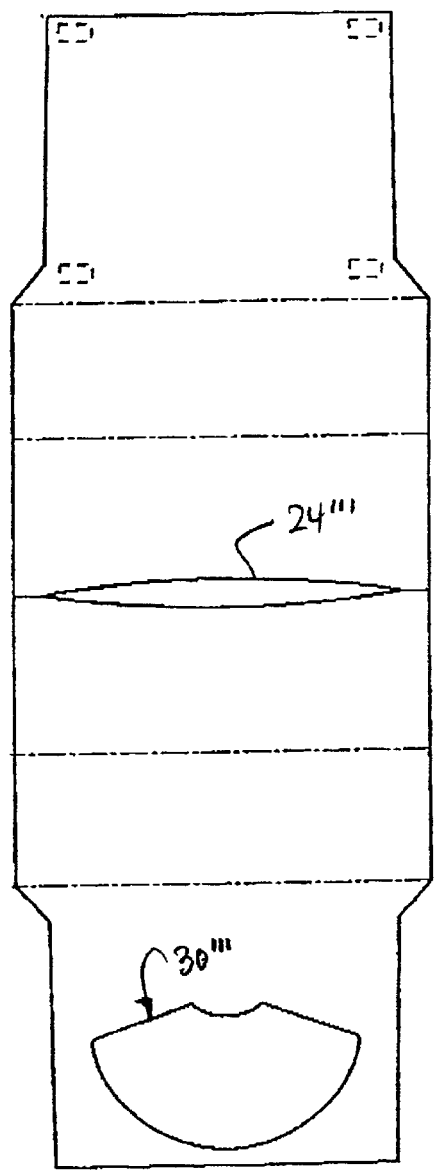
Figure 21B:
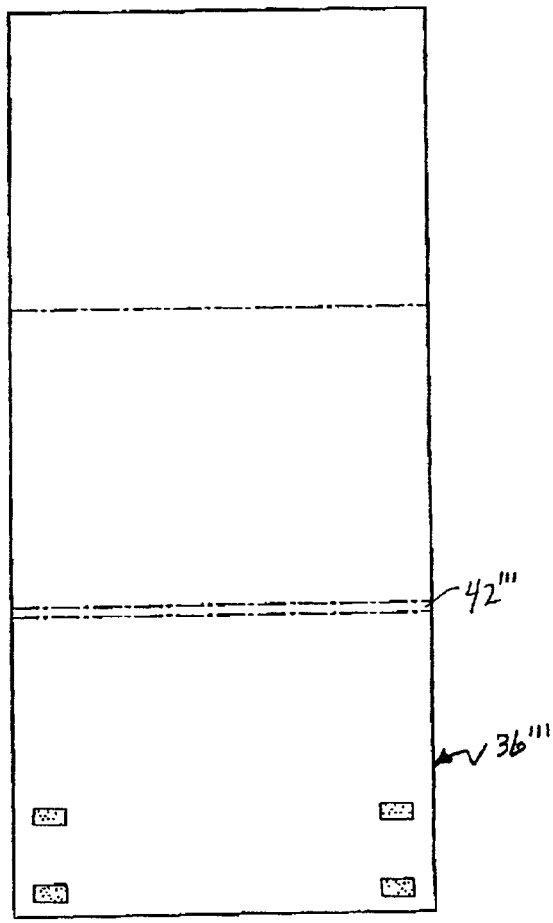
Figure 21F:
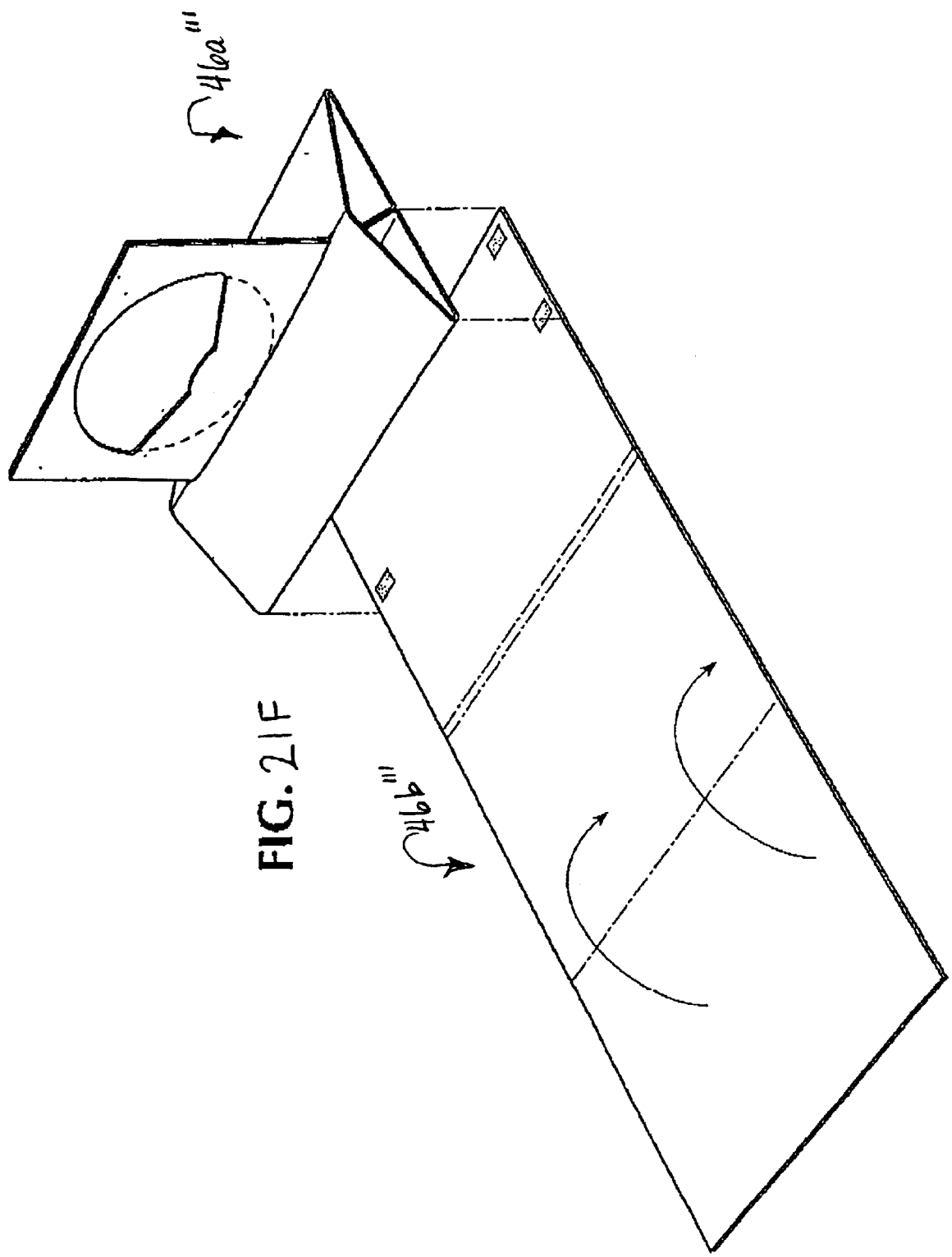
Figure 22:
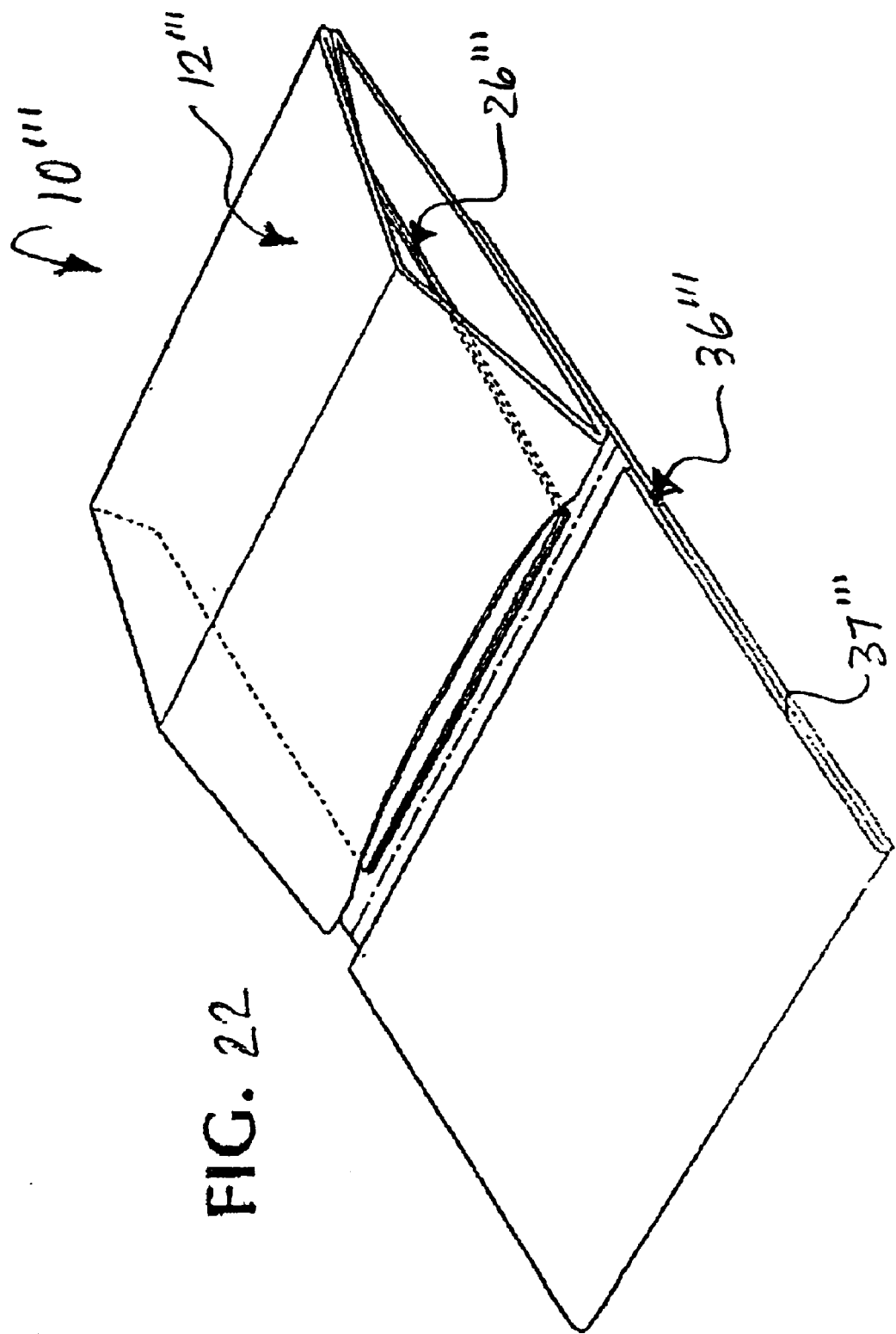

Packaging system 10" and 10''' are assembled similarly to packaging system 10 and 10'. It may be constructed from two blanks 46a" and 46b", or 46a''' and 46b''', as shown in FIGS. 15A–H, and 21A–H. Advantageously, blank 46b" and 46b''' is connected to at least one lower base panel 18" or 19", and 18''' or 19'''. This is desirable because it facilitates base 12", 12''' in supporting upright body 26", 26''' on a generally flat surface and further eliminates the need for any interference between upright body 26", 26''' and base 12", 12''' to hold packaging system 10", 10''' in display position. FIG. 16 and FIG. 22 show packaging system 10", 10''' with upright body 26", 26''' fully encompassed by base 12", 12'''. FIGS. 14B and 20 show packaging system 10", 10''' with elongate member 36", 36''' completely enfolding base 12", 12'''.

Packaging system 10" and 10''' may also include printing, especially in spine 42", 42''' seal(s) and other variations as previously described relative to packaging system 10 and 10'. Packaging system 10" and 10''' are manufactured as previously described relative to packaging system 10 and 10', and media items and bulky materials are inserted also as previously described.

Although the invention has been described with reference to a particular arrangement of parts, features and the like, many modifications and other embodiments of the invention will be apparent to one of ordinary skill in the art having the benefit of the teachings presented in the foregoing descriptions and the associated drawings. Therefore, it is understood that the invention is not limited to the specific embodiments described herein, which are exemplary, and that modifications and other embodiments are intended to be included within the scope of the claims.

What is claimed is:

1. A packaging system for media items, comprising abase having upper and lower panels with outer and inner ends, the inner ends having central portions, the panels being hingedly connected together along their respective outer and inner ends, the central portions of the inner ends being spaced apart from each other to define therebetween an elongate slot;

an upright body connected to said base and extending upwardly therefrom through the elongate slot, said upright body comprising a plurality of opposing panels defining a pocket having a shape such that it is capable of receiving and holding the media item; and an elongate member connected to said base having a construction such that said elongate member is capable of enfolding said base, wherein said base and said upright body are sized such that said base is capable of encompassing said upright body, and said base is capable of resting on a generally flat surface thereby supporting and displaying said upright body, yet the panel outer ends are capable of moving below said upright body while displaying said upright body.

2. The packaging system according to claim 1 wherein said elongate member has a spine.

3. The packaging system according to claim 2 wherein said elongate member has at least two panels and wherein the spine is hingedly connected between the elongate member panels such that it is adjacent to the inner ends of said base when said base is collapsed, and said elongate member enfolds said base.

4. The packaging systems according to claim 1 wherein the pocket has an edge with an upper opening with a shape such that the media item is held therein and a lower opening with a non-Incur shape.

5. The packaging system according to claim 4 wherein the pocket edge has opposing ends which terminate in holes.

6. The packaging system according to claim 4 wherein the lower pocket opening has a shape formed from a plurality of linear segments, or is curved.

7. The packaging system according to claim 4 wherein the lower pocket opening has a central portion with a semi-circular segment protruding toward the upper edge opening of the pocket.

8. The packaging system according to claim 1 further comprising a pouch connected to said elongate member such that said pouch is capable of folding over said base.

9. The packaging system according to claim 8 wherein said elongate member has an elongate side and said pouch is connected to said elongate side.

10. The packaging systems according to claim 1 wherein said elongate member is connected to at least one lower base panel.

11. A packaging system for media items, comprising:
   a base having upper and lower panels with outer and inner ends, the inner ends having central portions, the panels being hingedly connected together along their respective outer and inner ends, the central portions of the inner ends being spaced apart from each other to define therebetween an elongate slot;
   an upright body connected to said base, and extending upwardly therefrom through the elongate slot, said upright body comprising a plurality of opposing panels defining a pocket adapted to receive and hold the media item therein;
   a spine connected to said base; and
   an elongate member connected to said base having at least two panels, wherein said spine is hingedly connected to the elongate member such that said spine is adjacent to the inner ends of said base when said base is collapsed and said elongate member enfolds said base,
   wherein said base and said upright body are sized such that the upper and lower base panels are capable of encompassing said upright body, and said base is capable of resting on a generally flat surface thereby supporting and displaying said upright body, yet the panel outer ends are capable of moving below said upright body while displaying said upright body.

12. The packaging system according to claim 11 further comprising a pouch connected to said elongate member such that said pouch is capable of folding over said base.

13. The packaging system according to claim 12 wherein said elongate member has an elongate side and said pouch is connected to said elongate side.

14. A packaging system for media items, comprising:
   a base having upper and lower panels with outer and inner ends, the inner ends having central portions, the panels being hingedly connected together along their respective outer and inner ends, the central portions of the inner ends being spaced apart from each other to define therebetween an elongate slot;
   an upright body connected to said base, and extending upwardly therefrom through the elongate slot, said upright body comprising a plurality of opposing panels defining a pocket adapted to receive and hold the media item therein; and
   a spine connected to said base,
   wherein said base and said upright body are sized such that the upper and lower base panels are capable of encompassing said upright body, and said base is capable of resting on a generally flat surface thereby supporting and displaying said upright body, yet the panel outer ends are capable of moving below said upright body while displaying said upright body and the pocket has an edge with a lower opening that his a nonlinear shape and the pocket edge has opposing ends which terminate in holes.

15. The packaging system according to claim 14 wherein the lower pocket opening has a shape formed from a plurality of linear segments, or is curved.

16. A packaging system for media items comprising:
   a base having upper and lower panels with outer and inner ends, the inner ends having central portions, said panels being hingedly connected together along their respective outer and inner ends, the central portions of the inner ends being spaced apart from each other to define therebetween an elongate slot;
   an upright body connected to said base and extending upwardly therefrom through the elongate slot, said upright body comprising a plurality of opposing panels defining a pocket adapted to receive and hold the media item therein; and
   a pouch connected to said base such that said pouch is capable of folding over said base,
   wherein said base and said upright body are sized such that said base is capable of encompassing said upright body, and said base is capable of resting on a generally flat surface thereby supporting and displaying said upright body, yet the panel outer ends are capable of moving below said upright body while displaying said upright body.

17. The packaging system according to claim 16 further comprising an elongate member connected to said pouch.

18. The packaging system according to claim 16 wherein the pocket has an edge with a lower opening that has a nonlinear shape, the pocket edge having opposing ends which terminate in holes.

19. The packaging system according to claim 16 wherein the lower pocket opening has a shape formed from a plurality of linear segments, or is curved.

* * * * *